United States Patent
Cho et al.

(10) Patent No.: US 10,548,046 B2
(45) Date of Patent: Jan. 28, 2020

(54) METHOD OF TRANSMITTING AND RECEIVING PACKET IN WIRELESS COMMUNICATION SYSTEM AND APPARATUS THEREFOR

(71) Applicant: LG ELECTRONICS INC., Seoul (KR)

(72) Inventors: Heejeong Cho, Seoul (KR); Genebeck Hahn, Seoul (KR); Eunjong Lee, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/753,673

(22) PCT Filed: Apr. 18, 2016

(86) PCT No.: PCT/KR2016/004001
§ 371 (c)(1),
(2) Date: Feb. 20, 2018

(87) PCT Pub. No.: WO2017/030268
PCT Pub. Date: Feb. 23, 2017

(65) Prior Publication Data
US 2018/0249365 A1 Aug. 30, 2018

Related U.S. Application Data

(60) Provisional application No. 62/206,231, filed on Aug. 17, 2015.

(51) Int. Cl.
*H04W 28/02* (2009.01)
*H04W 28/04* (2009.01)
(Continued)

(52) U.S. Cl.
CPC ....... *H04W 28/0263* (2013.01); *H04W 28/04* (2013.01); *H04W 28/12* (2013.01); *H04W 72/14* (2013.01); *H04W 56/00* (2013.01)

(58) Field of Classification Search
CPC . H04W 28/0263; H04W 28/02; H04W 28/04; H04W 28/12; H04W 72/12; H04W 72/14
See application file for complete search history.

(56) References Cited

U.S. PATENT DOCUMENTS

2005/0036497 A1  2/2005  Kawakami
2008/0137618 A1  6/2008  Sung et al.
(Continued)

FOREIGN PATENT DOCUMENTS

WO  WO 2014/047899 A1  4/2014
WO  WO 2014/129870 A1  8/2014
WO  WO 2014/191050 A1  12/2014

*Primary Examiner* — Derrick W Ferris
*Assistant Examiner* — Kevin H Lee
(74) *Attorney, Agent, or Firm* — Birch, Stewart, Kolasch & Birch, LLP

(57) ABSTRACT

A method for transmitting and receiving a packet performed by a first network node in a wireless communication system according to the present disclosure includes receiving a first message in relation to a connection configuration of a specific flow from a user equipment (UE); receiving a second message in relation to a response to the first message from a second network node (e.g., MME/GW); checking whether the first flow ID and the second flow ID are identical; transmitting a UL grant to the UE by considering a processing time of the UE; and receiving a third message from the UE through the UL grant.

12 Claims, 30 Drawing Sheets

(51) Int. Cl.
*H04W 72/14* (2009.01)
*H04W 28/12* (2009.01)
*H04W 56/00* (2009.01)

(56) References Cited

U.S. PATENT DOCUMENTS

| | | |
|---|---|---|
| 2011/0007681 A1 | 1/2011 | Park et al. |
| 2011/0164515 A1* | 7/2011 | Park ............... H04L 1/0061 370/252 |
| 2012/0002583 A1* | 1/2012 | Kong ............... H04W 92/045 370/312 |
| 2015/0063113 A1 | 3/2015 | Yoshida et al. |
| 2015/0181504 A1 | 6/2015 | Tsai |
| 2015/0289289 A1* | 10/2015 | Qian ............... H04L 5/0055 370/329 |

* cited by examiner

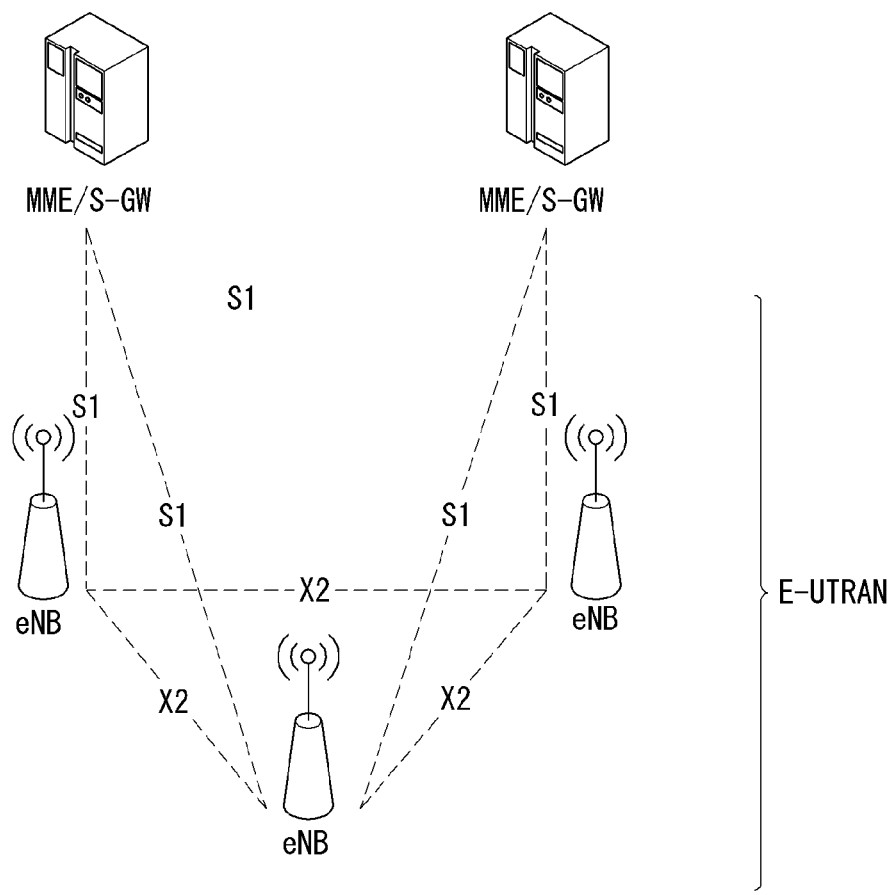
[Figure 1]

[Figure 2]
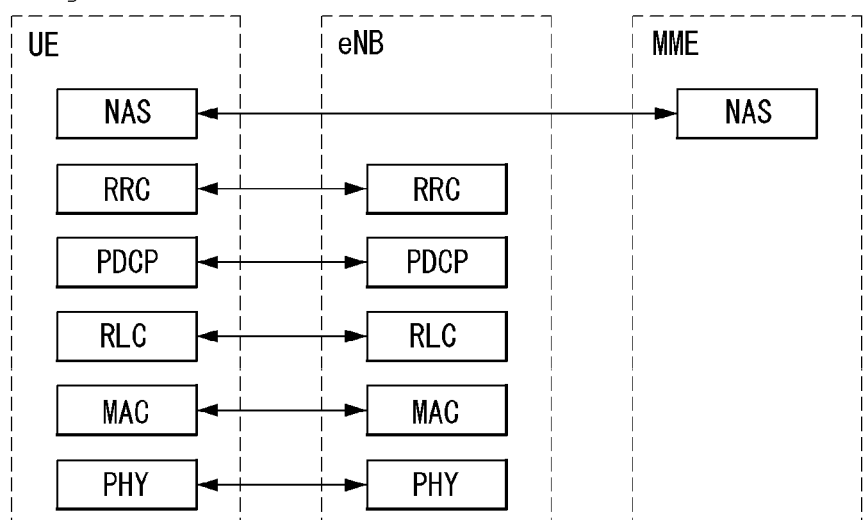
(a) Control plane protocol stack
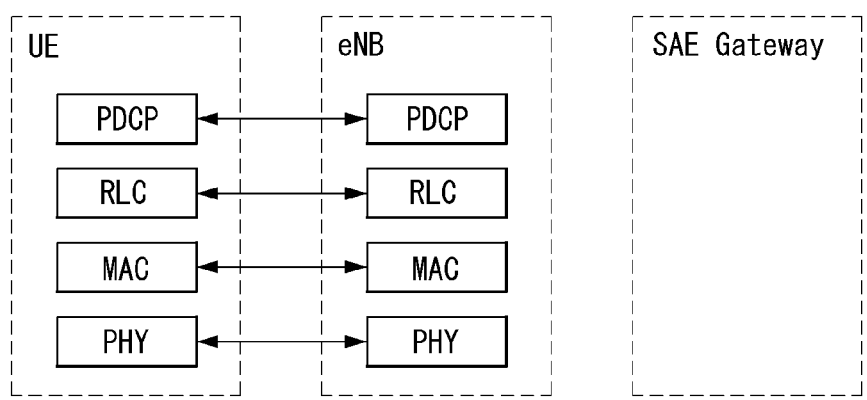
(b) User plane protocol stack

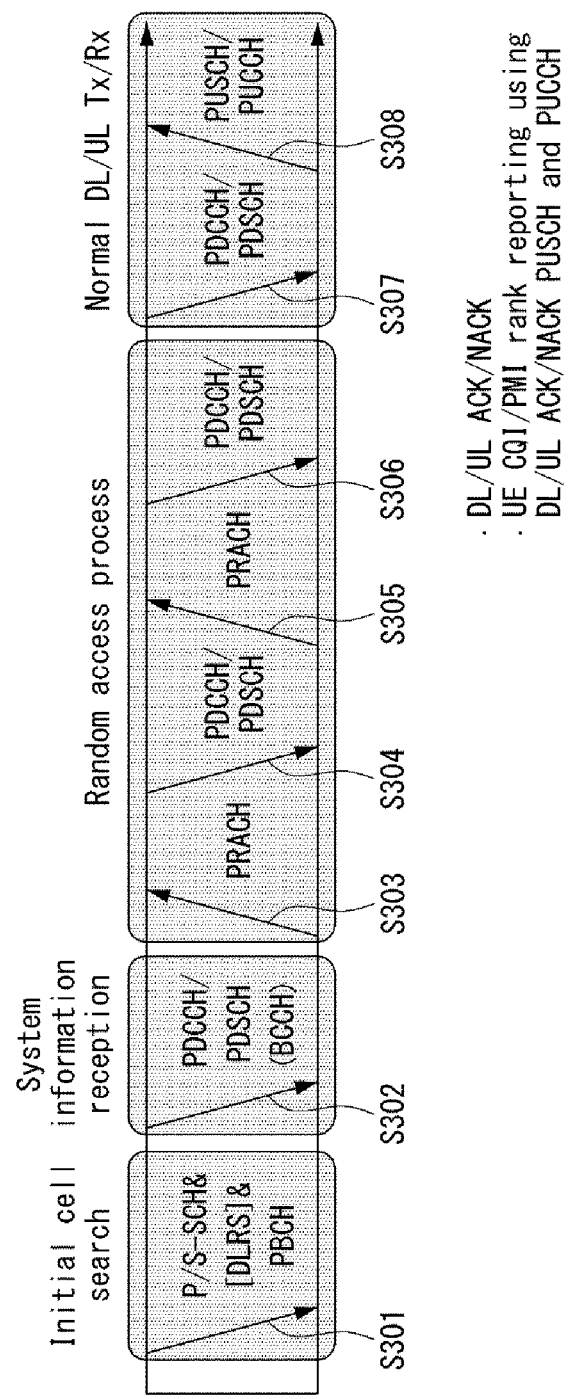

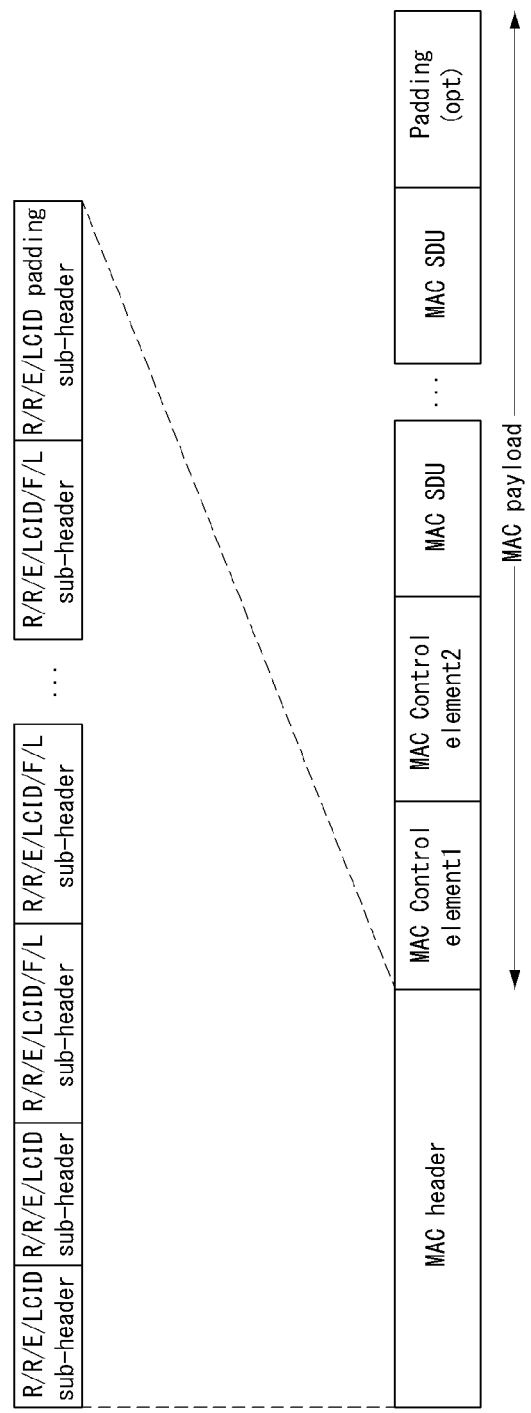
[Figure 4]

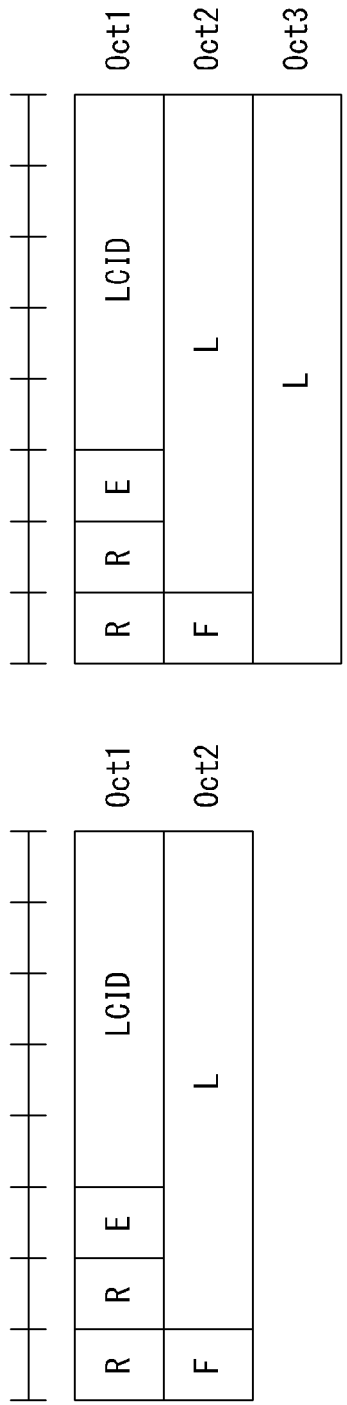
[Figure 5]

[Figure 6]
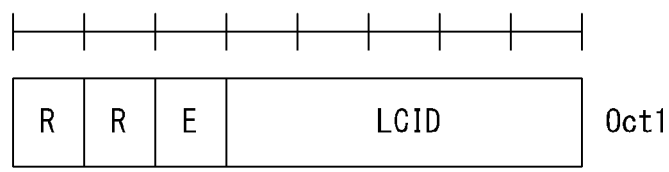
R/R/E/LCID sub-header
[Figure 7]
(a) 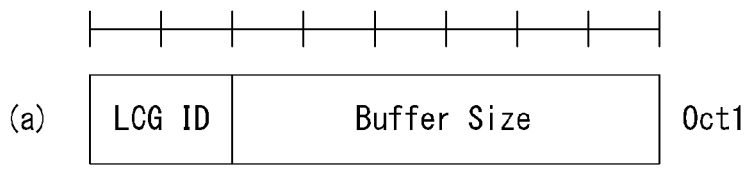
(b) 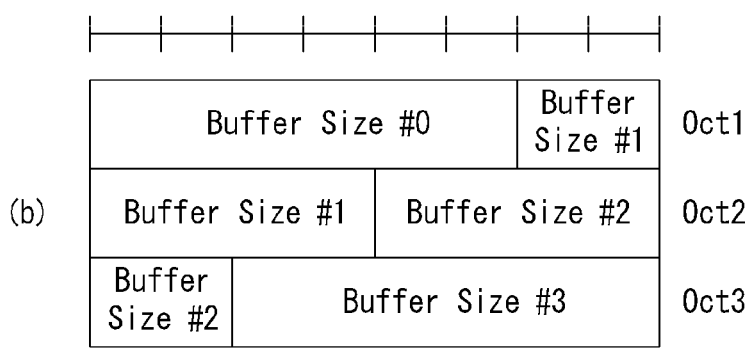

[Figure 8]
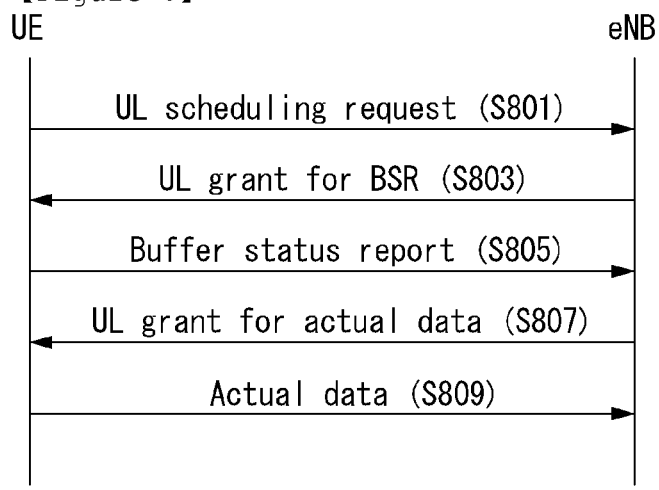
(a)
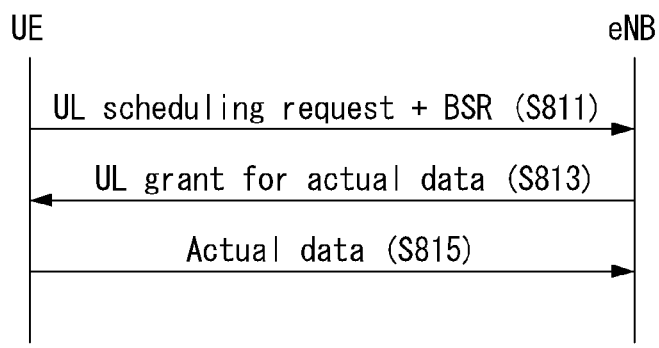
(b)

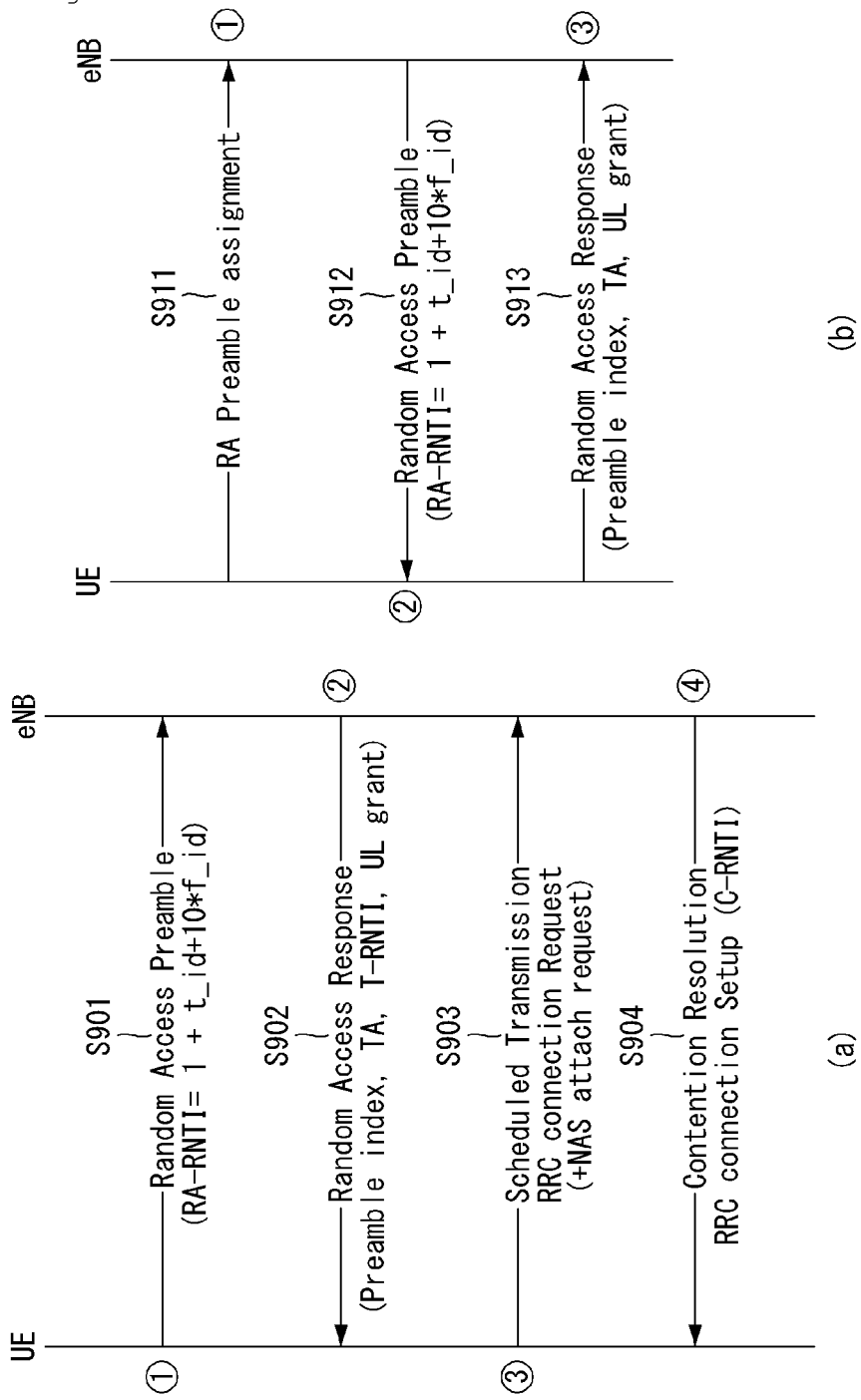

[Figure 10]

| Ver 4bits | HLen 4bits | Service Type 8bits | Total Length 16bits ||
|---|---|---|---|---|
| Identification 16bits ||| Flags 3bits | Fragmentation offset 13bits |
| Time to live(TTL) 8bits || Protocol 8bits | Header Checksum 16bits ||
| Source IP address |||||
| Destination IP address |||||
| Option |||||

| Source Port || Destination Port |||||||
|---|---|---|---|---|---|---|---|---|
| Sequence Number ||||||||| 
| Acknowledgement Number |||||||||
| Data Offset | Reserved | URG | ACK | PSH | RST | SYN | FIN | Window |
| Checksum |||||| Urgent Pointer |||
| Options |||||||| Padding |

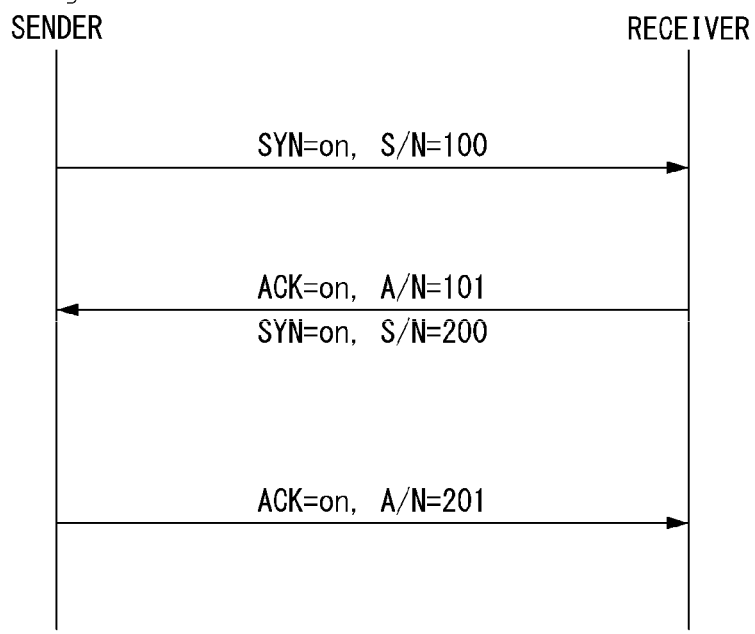
[Figure 12]

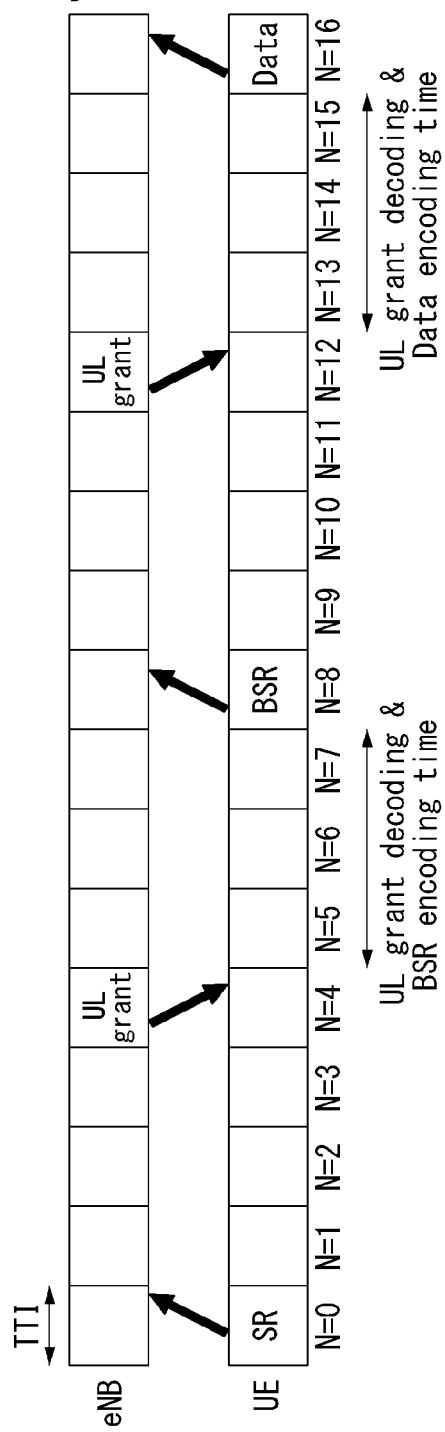

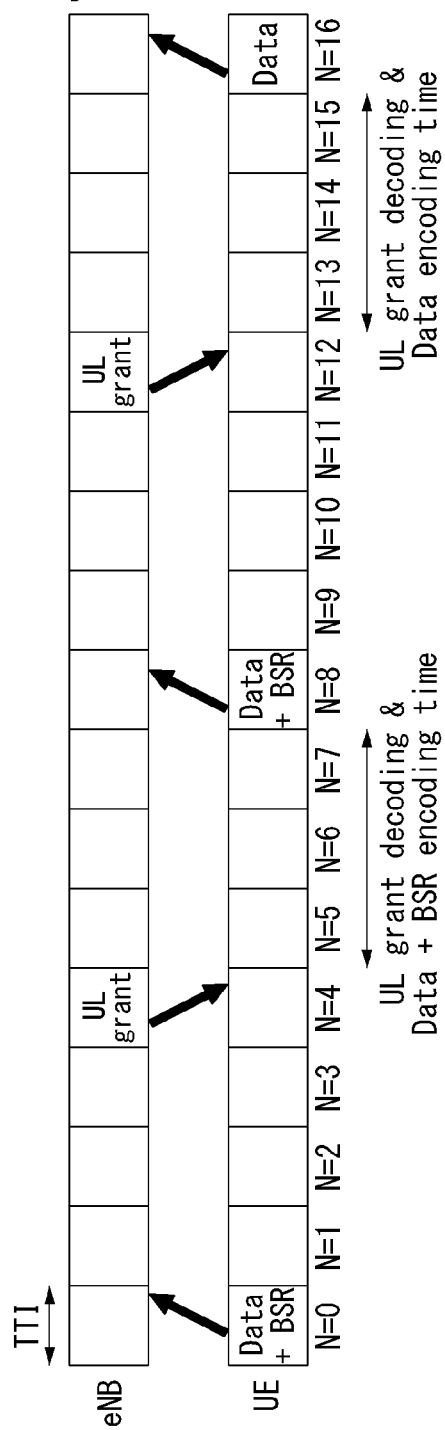
[Figure 14]

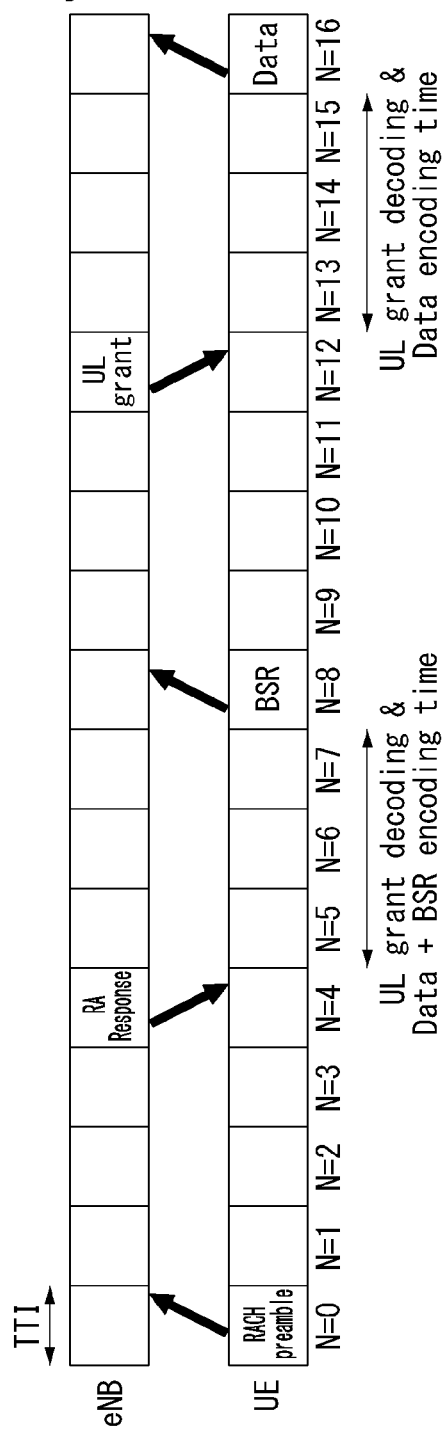
[Figure 15]

【Figure 16】
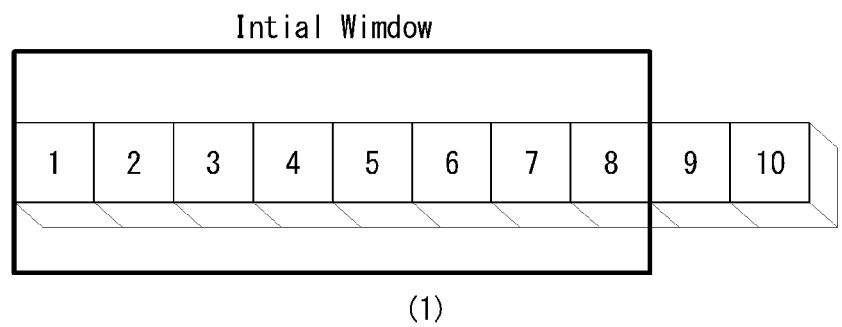
(1)
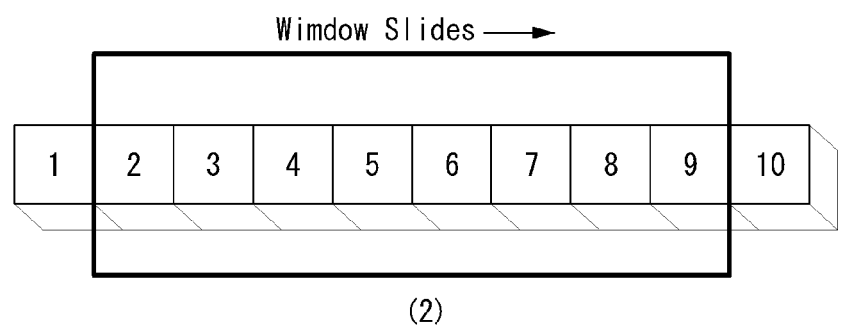
(2)
【Figure 17】
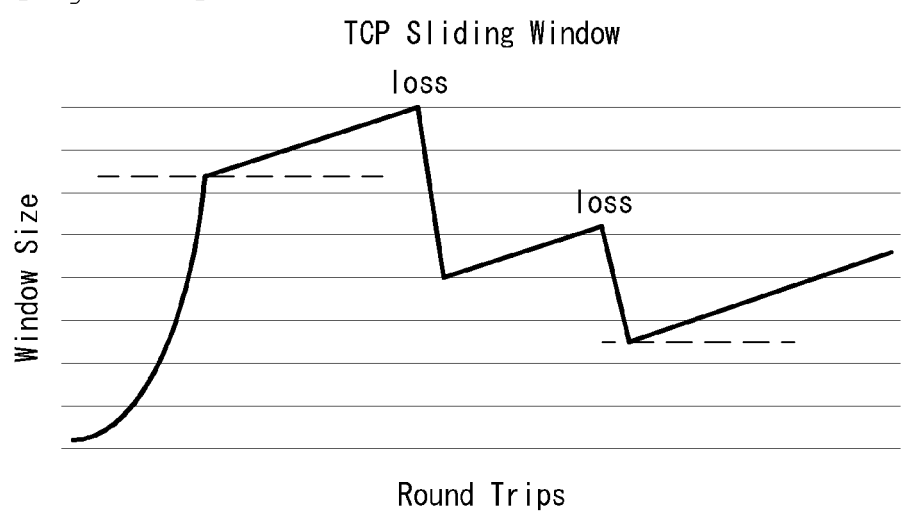

[Figure 18]
MANAGEMENT IN
A UNIT OF FLOW:
Flow ID A
MANAGEMENT IN
A UNIT OF BEARER
(a)
(b)

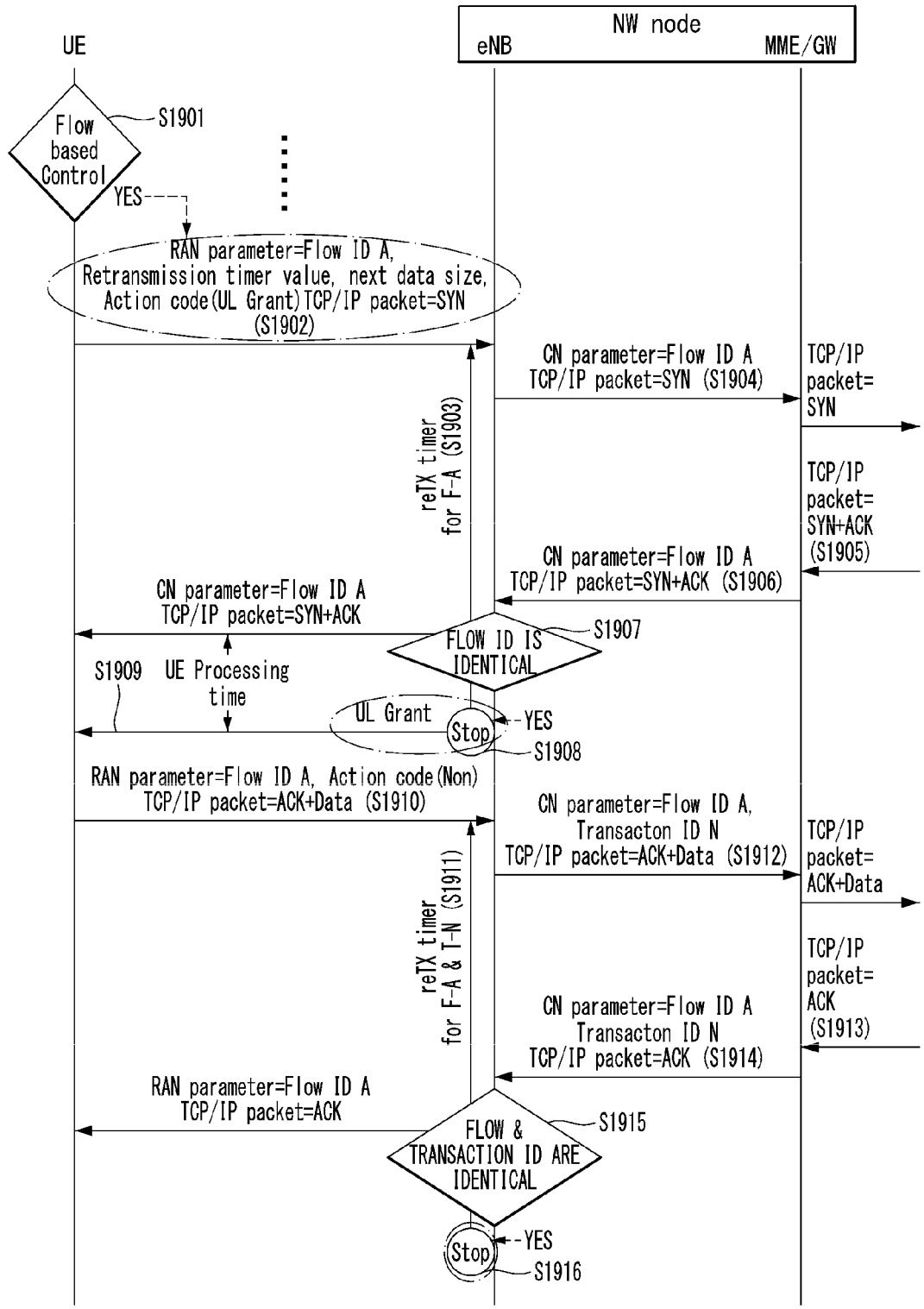
[Figure 19]

| Bearer ID | Flow ID | Source Address | Destination Address | Source Port | Destination Port | Protocol | reTX Timer |
|---|---|---|---|---|---|---|---|
| 1 | A | 1 | 2 | Video | * | TCP | 100ms |
| 1 | A | 2 | 1 | Video | * | TCP | 100ms |

(b) eNB

| Bearer ID | Flow ID | reTX Timer |
|---|---|---|
| 1 | A | 100ms |
| 1 | A | 100ms |

(c) GW

| Bearer ID | Flow ID | Source Address | Destination Address | Source Port | Destination Port | Protocol |
|---|---|---|---|---|---|---|
| 1 | A | 1 | 2 | Video | * | TCP |
| 1 | A | 2 | 1 | Video | * | TCP |

[Figure 21]

(a) | HEADER | ADDITIONAL HEADER (INFORMATION OF REQUESTING A PROTOCOL DETECTION TYPE RADIO RESOURCE MANAGEMENT) | SDU (HIGHER LAYER PACKET) |

(b) | HEADER | ADDITIONAL HEADER (INFORMATION OF REQUESTING A PROTOCOL DETECTION TYPE RADIO RESOURCE MANAGEMENT) | SDU (RRC MESSAGE) |

(c) | HEADER | ADDITIONAL HEADER (INFORMATION OF REQUESTING A PROTOCOL DETECTION TYPE RADIO RESOURCE MANAGEMENT) | SDU (RRC MESSAGE + HIGHER LAYER PACKET) |

(d) | HEADER | SDU (RRC MESSAGE INCLUDING INFORMATION OF REQUESTING A PROTOCOL DETECTION TYPE RADIO RESOURCE MANAGEMENT) |

(e) | EXISTING HEADER | SDU (INFORMATION OF REQUESTING A PROTOCOL DETECTION TYPE RADIO RESOURCE MANAGEMENT + RRC MESSAGE INCLUDING HIGHER LAYER PACKET) |

[Figure 22]
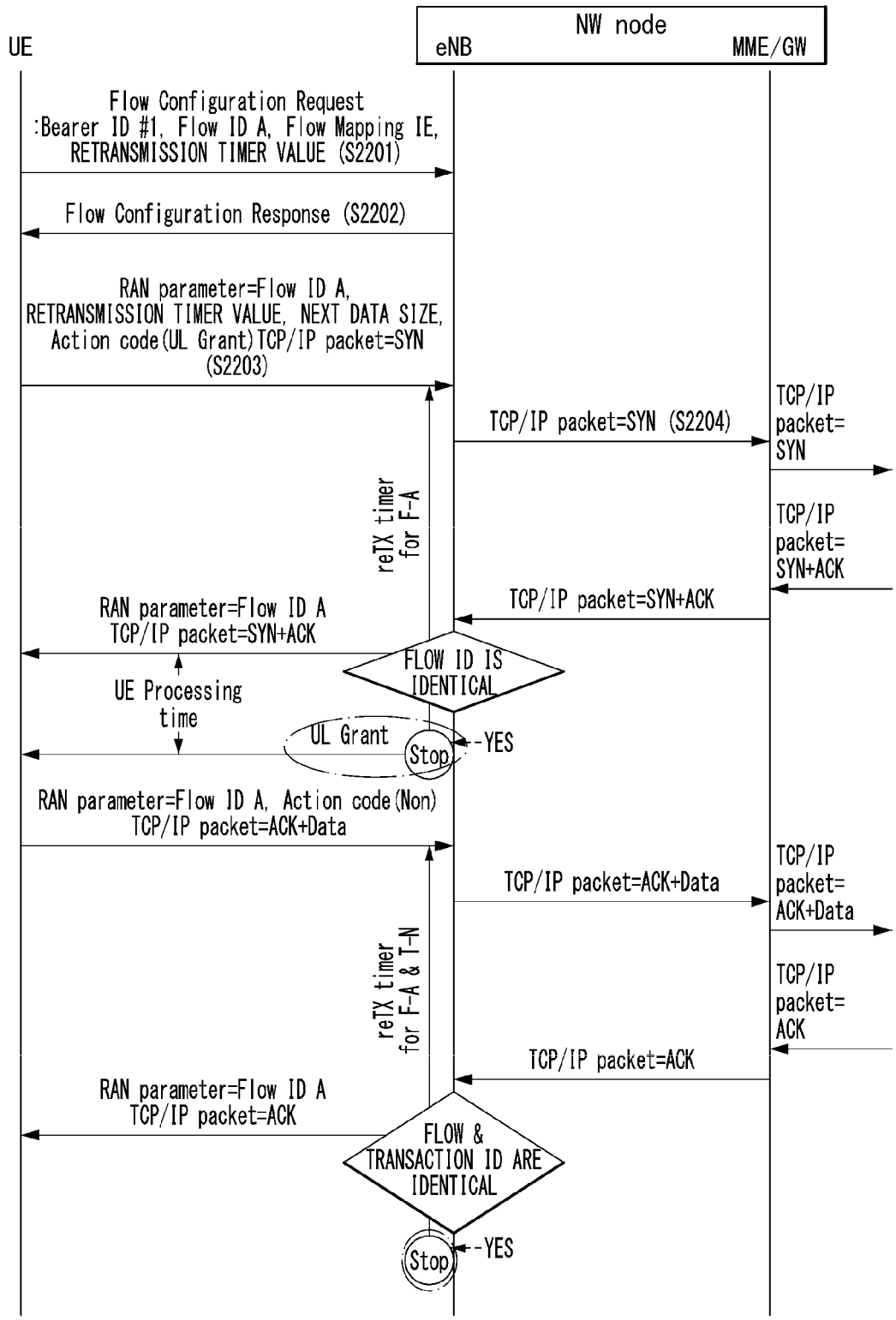

| Bearer ID | Flow ID | Source Address | Destination Address | Source Port | Destination Port | Protocol | reTX Timer |
|---|---|---|---|---|---|---|---|
| 1 | A | 1 | 2 | Video | * | TCP | 100ms |
| 1 | A | 2 | 1 | Video | * | TCP | 100ms | eNB (b)

| Bearer ID | Flow ID | Source Address | Destination Address | Source Port | Destination Port | Protocol | reTX Timer |
|---|---|---|---|---|---|---|---|
| 1 | A | 1 | 2 | Video | * | TCP | 100ms |
| 1 | A | 2 | 1 | Video | * | TCP | 100ms |

GW (c)

| Bearer ID | Source Address | Destination Address | Source Port | Destination Port | Protocol |
|---|---|---|---|---|---|
| 1 | 1 | 2 | Video | * | TCP |
| 1 | 2 | 1 | Video | * | TCP |

【Figure 24】
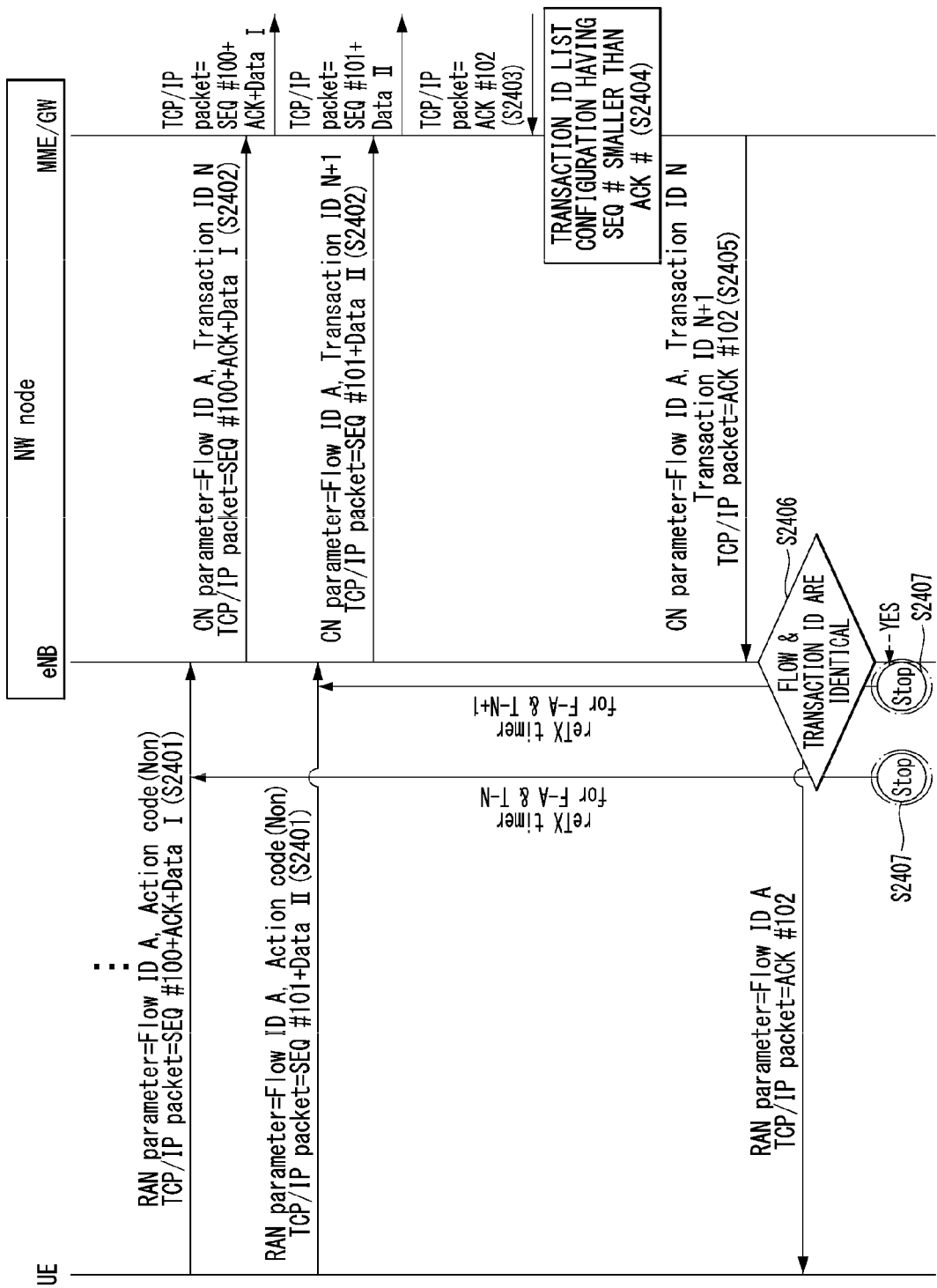

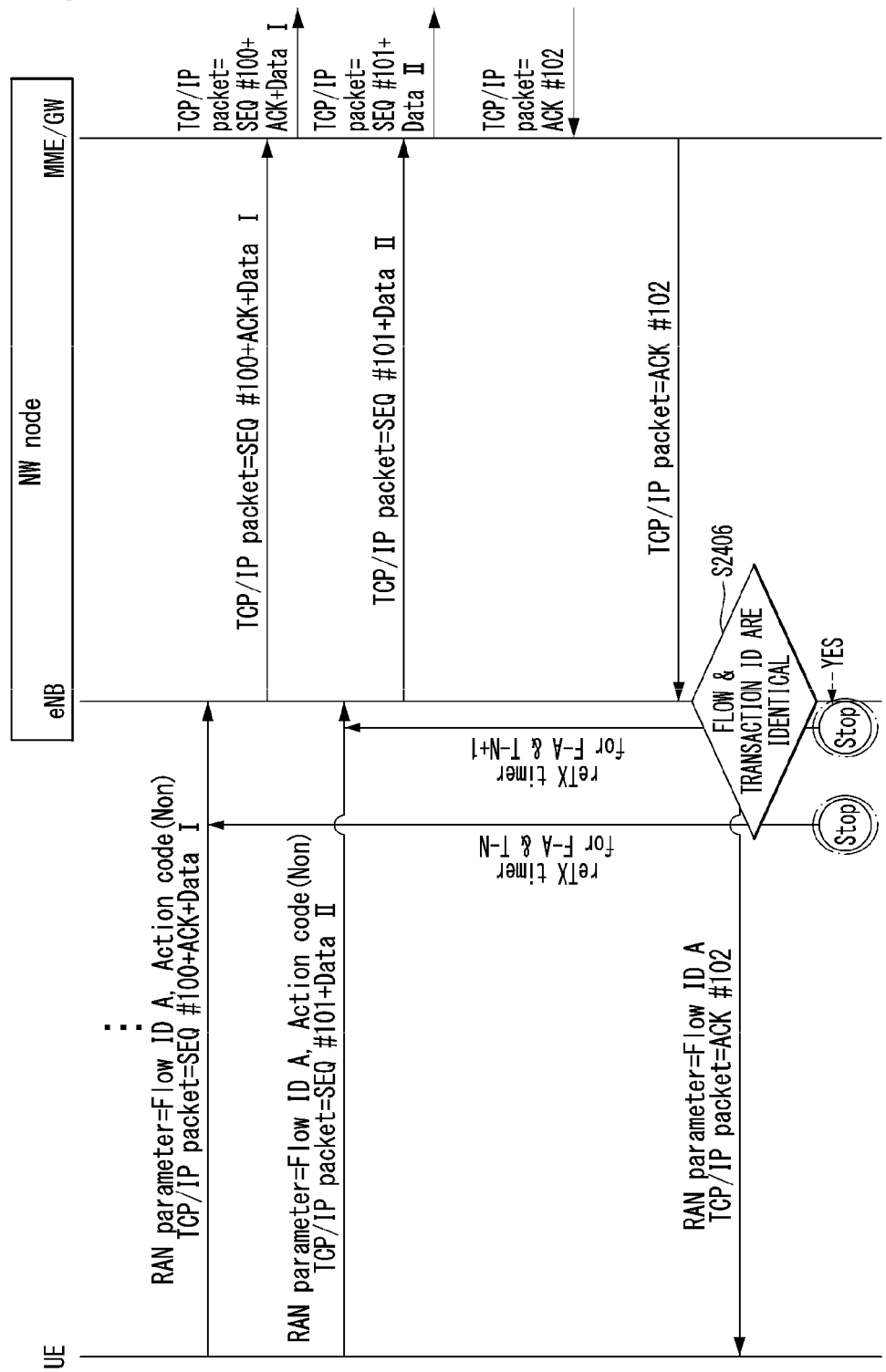
[Figure 25]

[Figure 26]
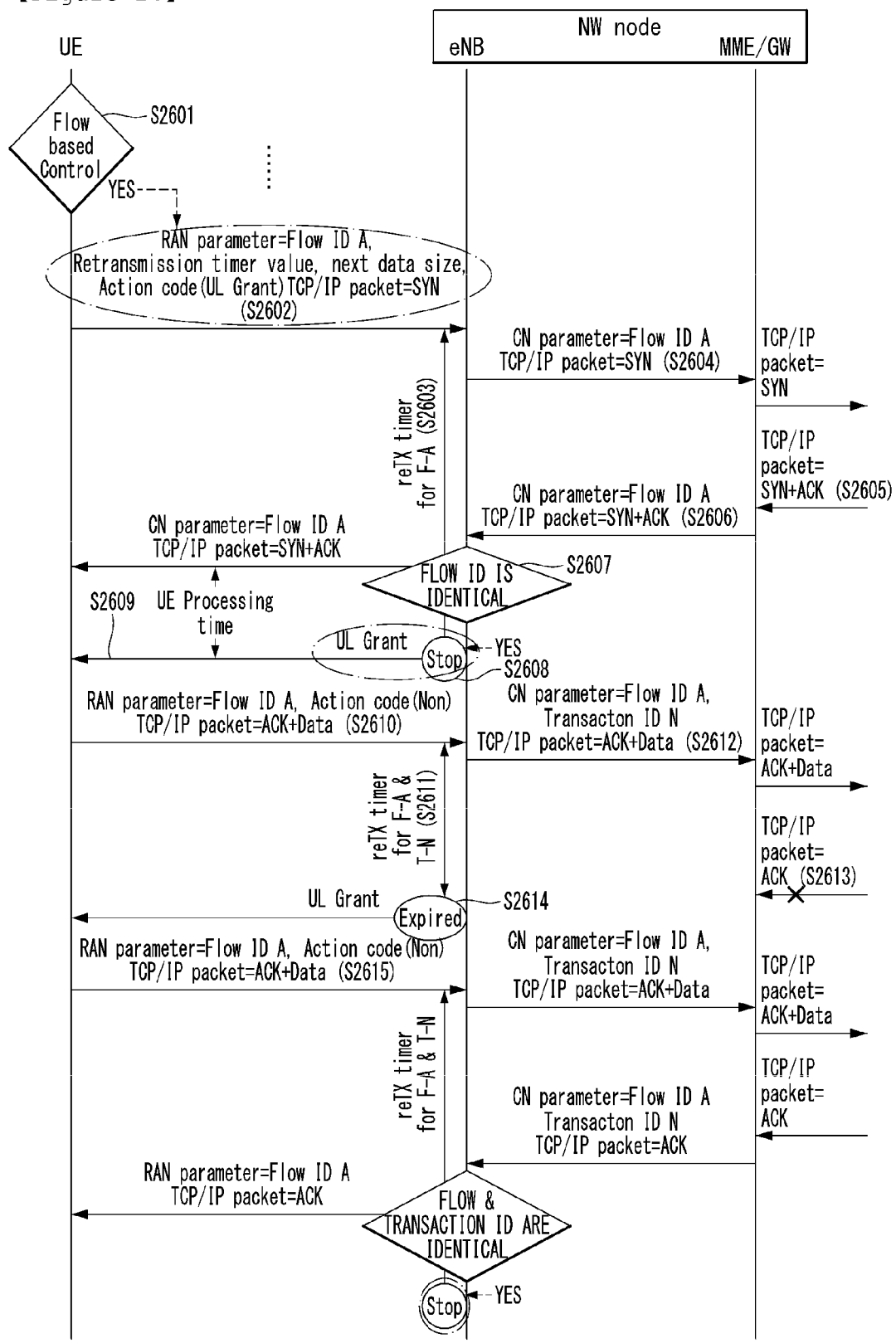

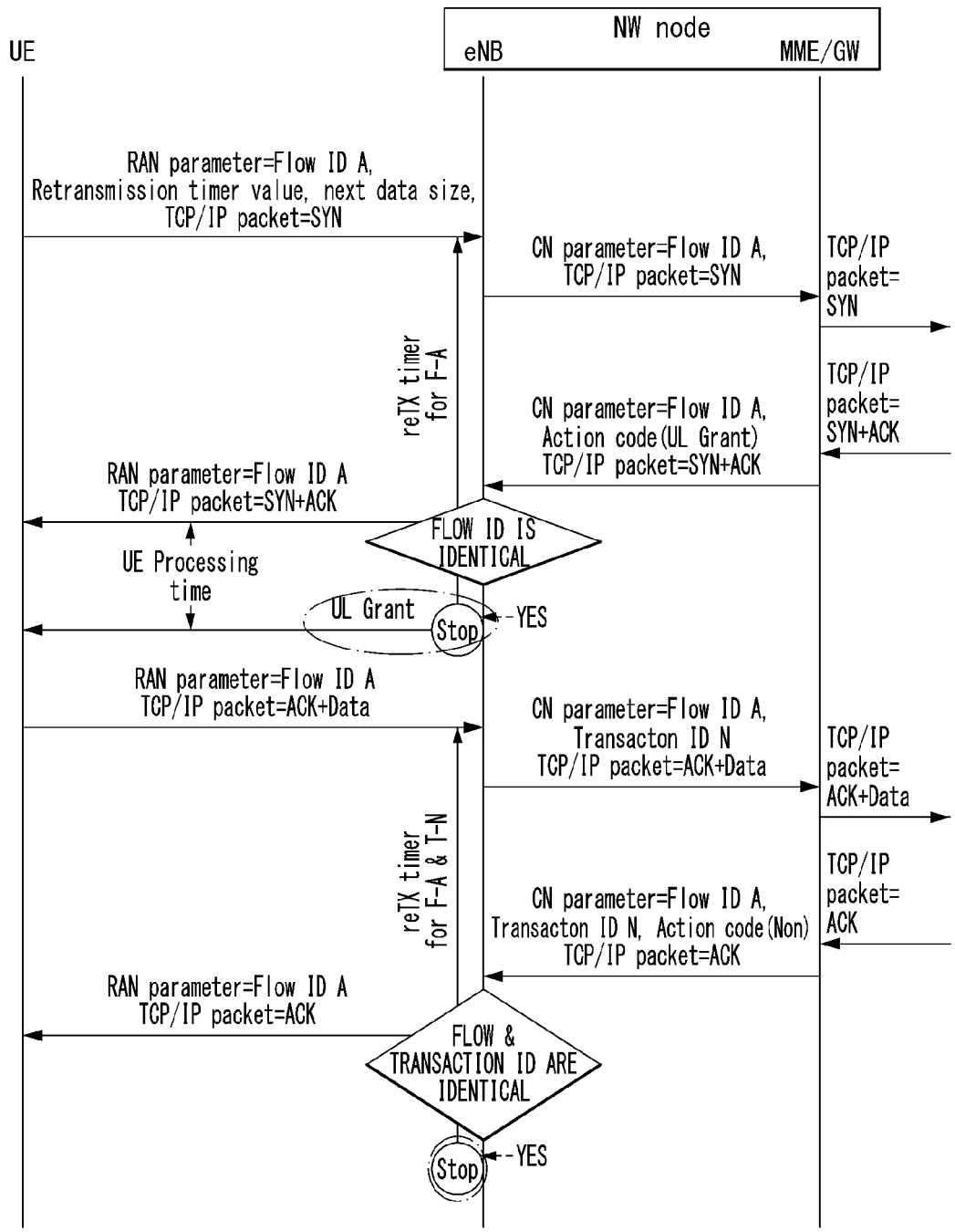
[Figure 27]

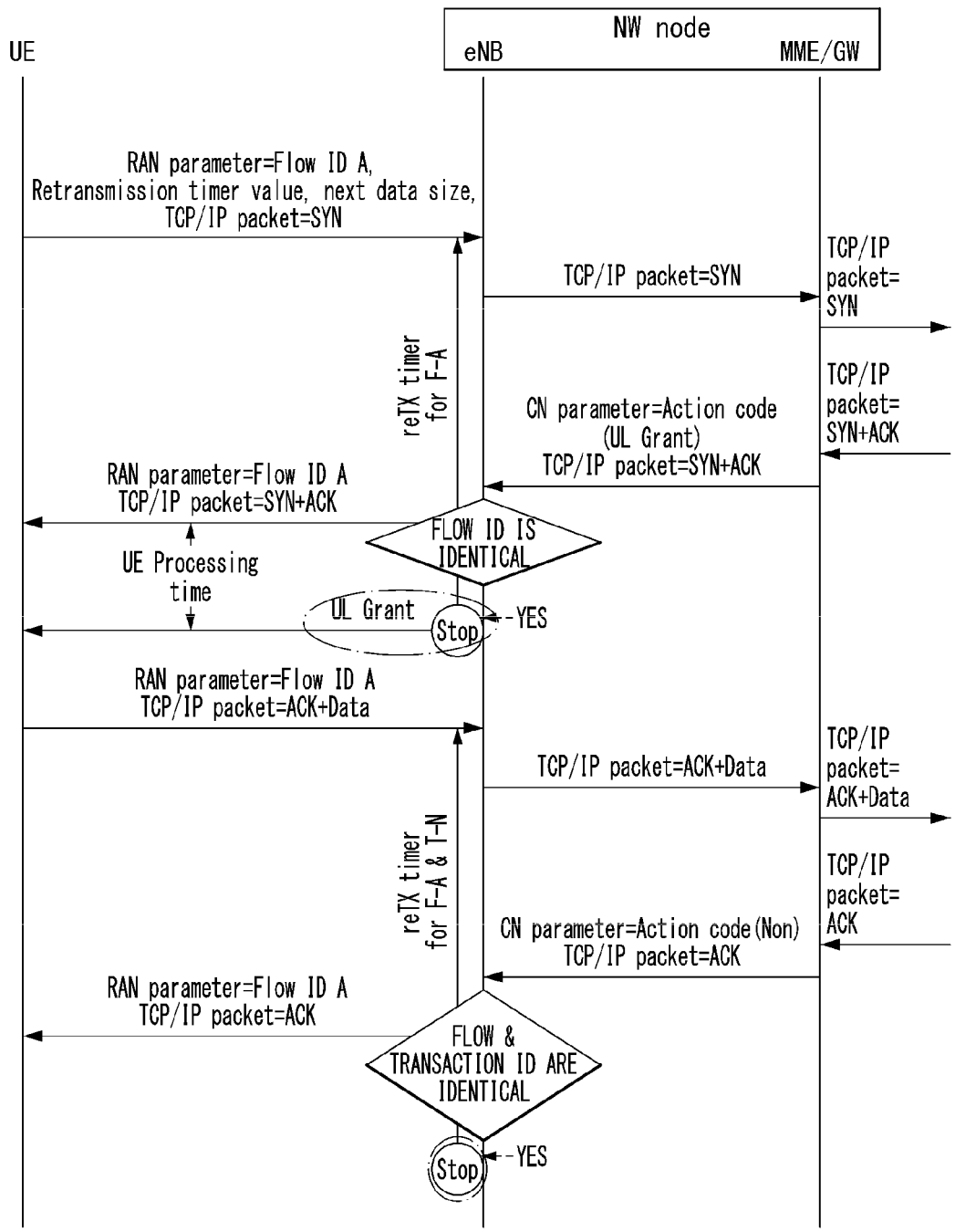
[Figure 28]

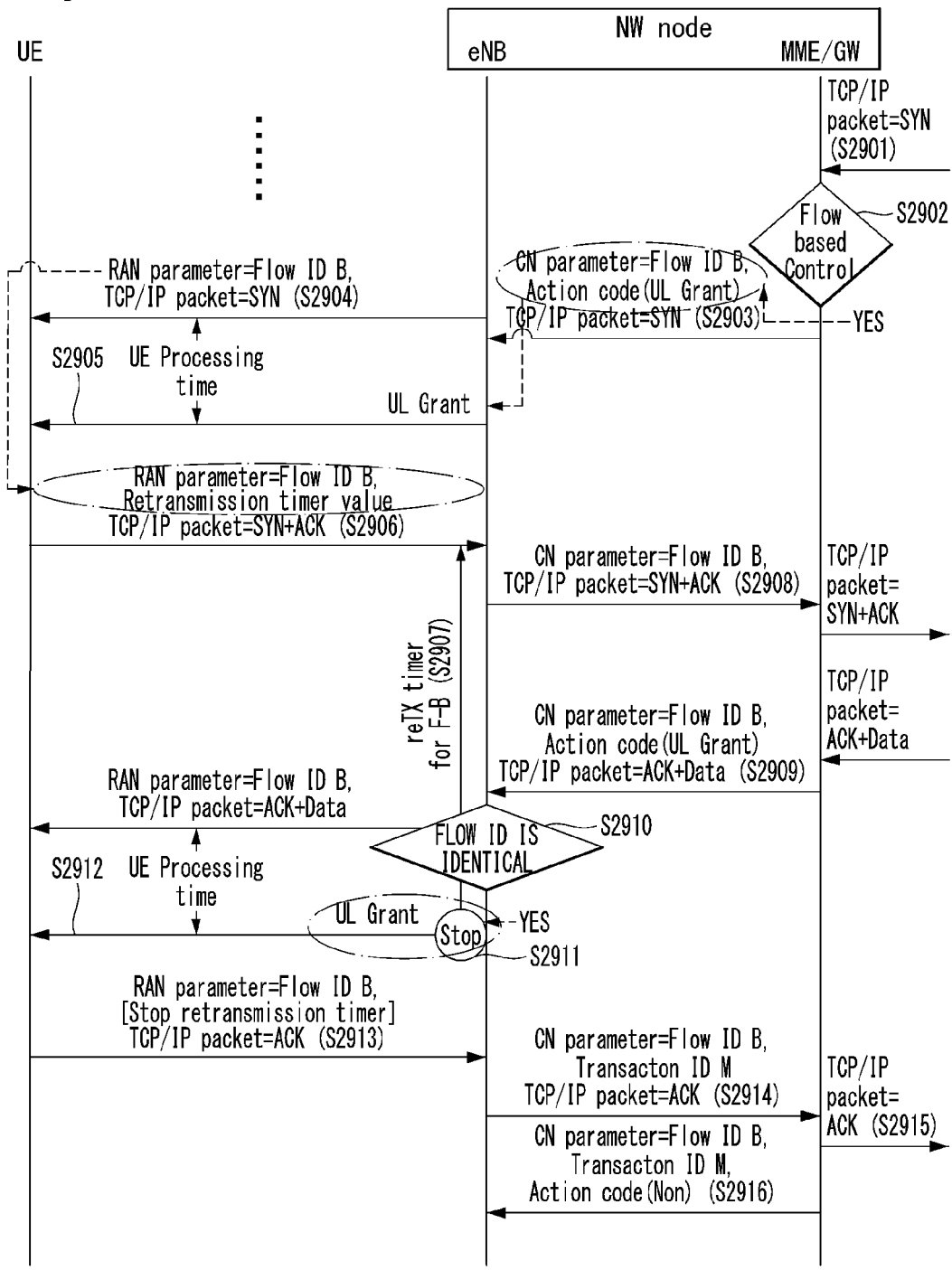
[Figure 29]

【Figure 30】
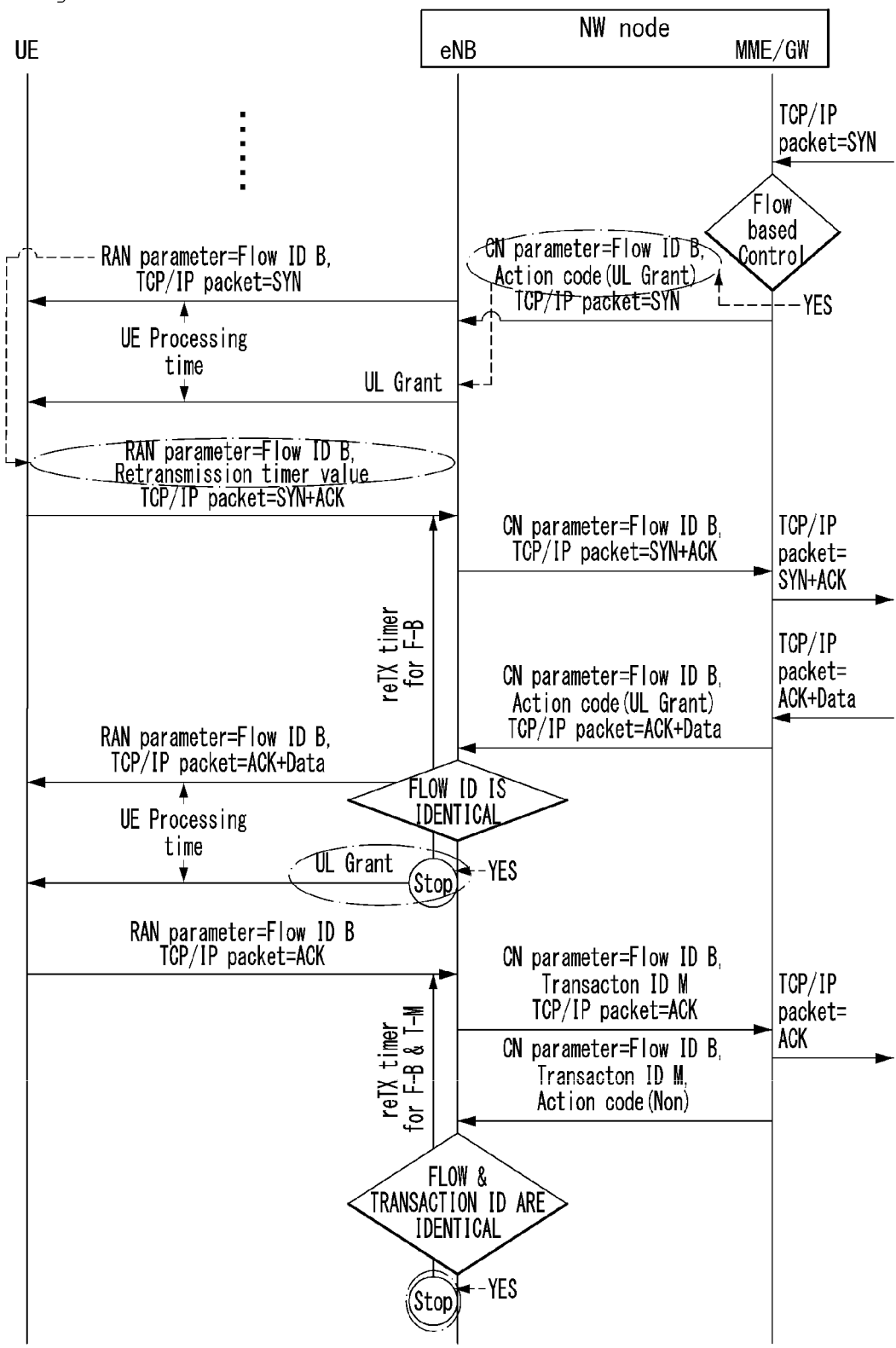

【Figure 31】
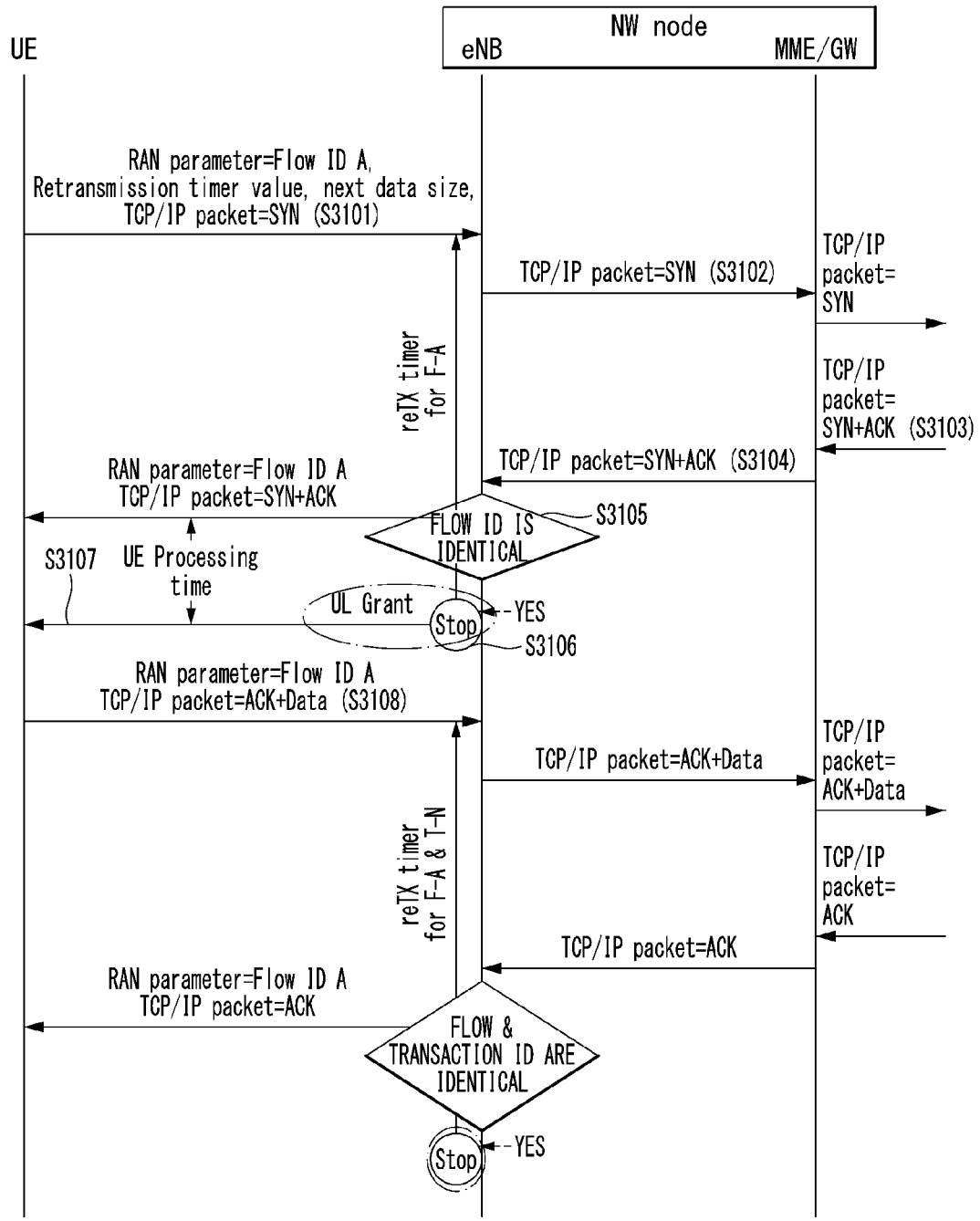

[Figure 32]
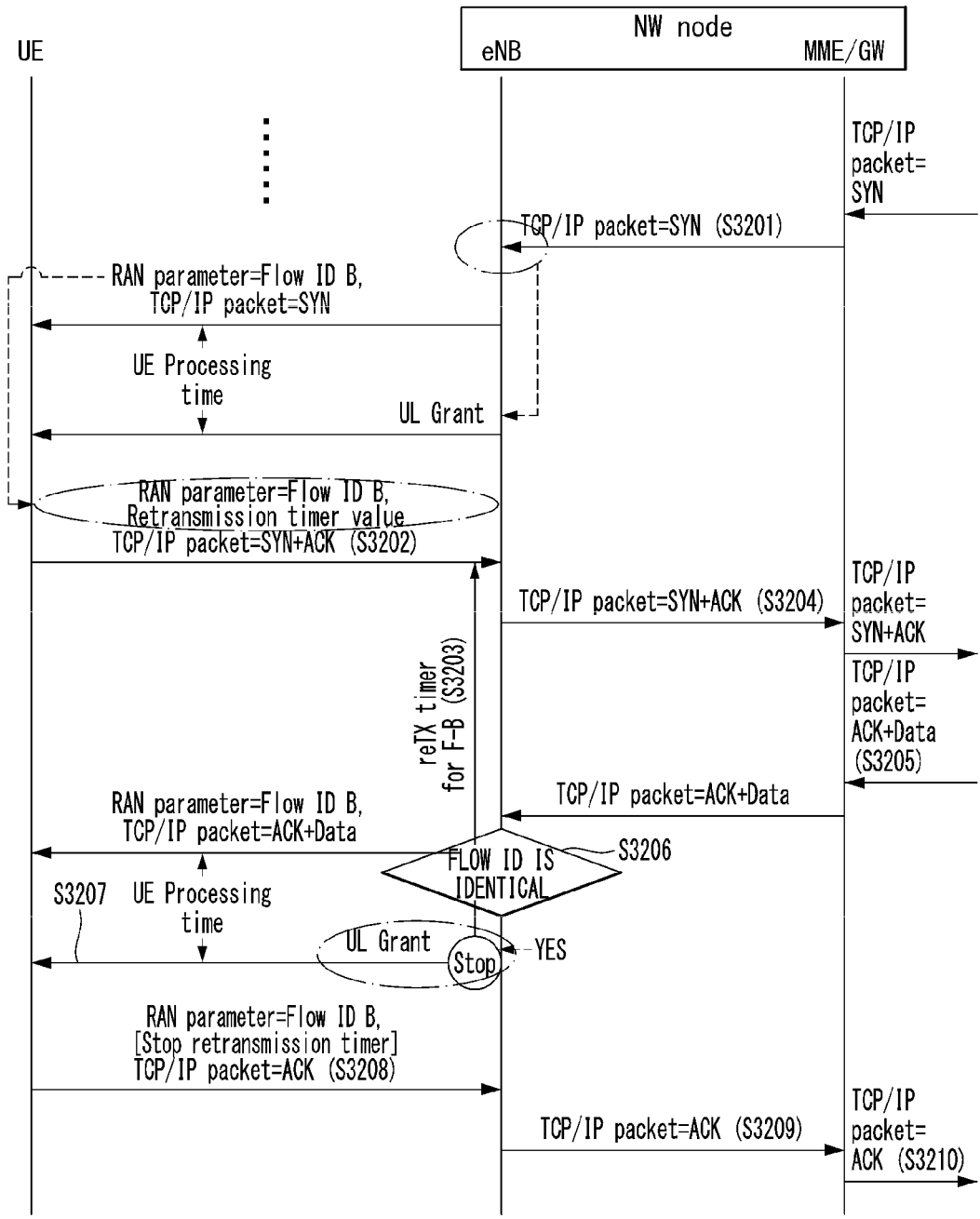

【Figure 33】
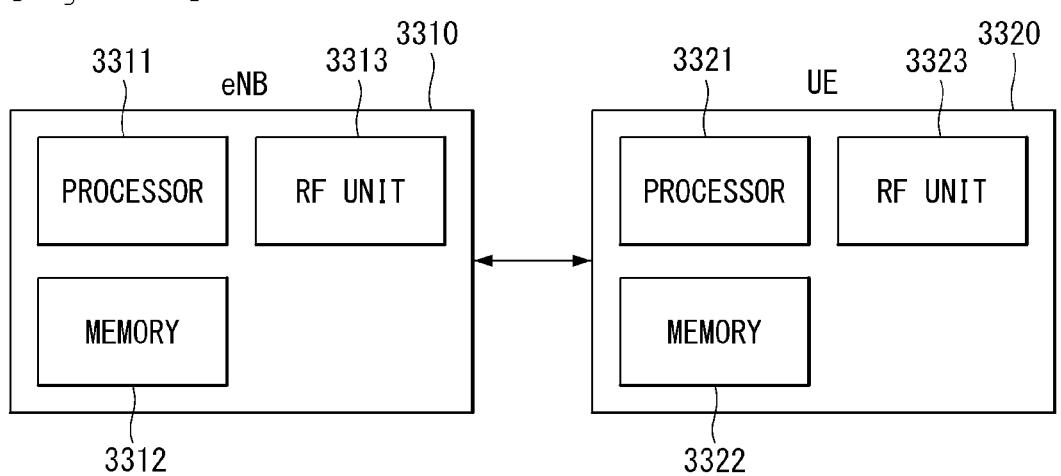

METHOD OF TRANSMITTING AND RECEIVING PACKET IN WIRELESS COMMUNICATION SYSTEM AND APPARATUS THEREFOR

CROSS REFERENCE TO RELATED APPLICATIONS

This application is the National Phase of PCT International Application No. PCT/KR2016/004001, filed on Apr. 18, 2016, which claims priority under 35 U.S.C. 119(e) to U.S. Provisional Application No. 62/206,231, filed on Aug. 17, 2015, all of which are hereby expressly incorporated by reference into the present application.

TECHNICAL FIELD

The present invention relates to wireless communication systems, and more particularly, to a method for transmitting and receiving a packet between terminals and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present disclosure is to provide a method for allocating an uplink radio resource for a service to which a protocol (e.g., TCP) having signaling such as a connection configuration, a reception response, and the like is applied.

In addition, an object of the present disclosure is to provide a method for managing a specific service in a flow unit The technical objects to attain in the present disclosure are not limited to the above-described technical objects and other technical objects which are not described herein will become apparent to those skilled in the art from the following description.

Technical Solution

A method for transmitting and receiving a packet performed by a first network node (e.g., base station) in a wireless communication system according to the present disclosure includes receiving a first message in relation to a connection configuration of a specific flow from a user equipment (UE), wherein the first message includes at least one of first control information in relation to the specific flow or a synchronization (SYN) packet, and wherein the first control information includes at least one of a first flow identifier (ID) distinguishing a flow, a retransmission timer value in relation to a packet retransmission, data size information indicating a size of a next data or first action code information instructing a resource allocation of the first network node; receiving a second message in relation to a response to the first message from a second network node, wherein the second message includes at least one of SYN/ACK packet or a second flow identifier (ID) distinguishing a flow; checking whether the first flow ID and the second flow ID are identical; transmitting a UL grant to the UE by considering a processing time of the UE; and receiving a third message from the UE through the UL grant.

In addition, in the present disclosure, the third message includes at least one of second control information and ACK/Data packet.

In addition, in the present disclosure, the second control information includes the first flow ID and second action code information instructing no action of a base station (BS).

In addition, the present disclosure further includes driving a retransmission timer for the first message after receiving the first message.

In addition, the present disclosure further includes stopping the retransmission timer when the first flow ID and the second flow ID are identical as a result of the check.

In addition, in the present disclosure, the first message, the second message and the third message are MAC Protocol Data Units (PDUs), and the first control information and the second control information are included in a header included in the MAC PDU.

In addition, in the present disclosure, the first message and the third message are RRC messages.

In addition, the present disclosure further includes receiving a flow configuration request message from the UE; and transmitting a flow configuration response message to the flow configuration request message to the UE.

In addition, in the present disclosure, the flow configuration request message includes at least one of a bearer ID, a flow ID, a flow mapping information element (IE) or a retransmission timer value for a flow, and the first control information does not includes the retransmission timer value.

In addition, a method for transmitting and receiving a packet performed by a first network node in a wireless communication system according to the present disclosure includes receiving a first message in relation to a connection configuration of a specific flow from a user equipment (UE), wherein the first message includes at least one of first control information in relation to the specific flow or a synchronization (SYN) packet, and wherein the first control information includes at least one of a first flow identifier (ID) distinguishing a flow, a retransmission timer value in relation to a packet retransmission, or data size information indicating a size of a next data; receiving a second message in relation to a response to the first message from a second network node, wherein the second message includes at least one of SYN/ACK packet, a second flow identifier (ID) distinguishing a flow or first action code information instructing a resource allocation of the first network node; checking whether the first flow ID and the second flow ID are identical; transmitting a UL grant to the UE by considering a processing time of the UE; and receiving a third message from the UE through the UL grant.

In addition, a method for transmitting and receiving a packet performed by a user equipment (UE) in a wireless communication system according to the present disclosure includes checking whether to perform a flow based control for a flow, wherein the flow based control maps a flow identifier (ID) for each flow; transmitting a first message in relation to a connection configuration of a specific flow to a first network node when performing the flow based control, wherein the first message includes at least one of first control information in relation to the specific flow or a synchronization (SYN) packet; receiving a second message in relation to a response to the first message from the first network node, wherein the second message includes SYN/ACK packet; receiving a UL grant from the first network node; and transmitting a third message to the first network node based on the received UL grant.

In addition, a user equipment (UE) for transmitting and receiving a packet in a wireless communication system according to the present disclosure includes a radio frequency (RF) unit for transmitting and receiving a radio signal; and a processor functionally connected to the RF unit, wherein the processor is configured to perform: checking whether to perform a flow based control for a flow, wherein the flow based control maps a flow identifier (ID) for each flow; transmitting a first message in relation to a connection configuration of a specific flow to a first network node when performing the flow based control, wherein the first message includes at least one of first control information in relation to the specific flow or a synchronization (SYN) packet; receiving a second message in relation to a response to the first message from the first network node, wherein the second message includes SYN/ACK packet; receiving a UL grant from the first network node; and transmitting a third message to the first network node based on the received UL grant.

Technical Effects

According to the present disclosure, a specific service is managed in a flow unit, and the latency in an uplink radio resource allocation in relation to a connection configuration, a reception response, a retransmission, and the like may be minimized, and there is an effect of increasing throughput for the corresponding service The technical effects obtained in the present invention are not limited to the technical effects described above, and other technical effects not mentioned herein may be understood to those skilled in the art from the description below.

DESCRIPTION OF DRAWINGS

The accompanying drawings included as part of the detailed description in order to help understanding of the present invention provide embodiments of the present invention and describe the technical features of the present invention along with the detailed description.

FIG. 1 illustrates a schematic structure a network structure of an evolved universal mobile telecommunication system (E-UTRAN) to which the present invention can be applied.

FIG. 2 illustrates the configurations of a control plane and a user plane of a radio interface protocol between the E-UTRAN and a UE in the wireless communication system to which the present invention can be applied.

FIG. 3 illustrates physical channels and a view showing physical channels used for in the 3GPP LTE/LTE-A system to which the present invention can be applied.

FIG. 4 illustrates the MAC PDU used in the MAC entity in the wireless communication system to which the present invention can be applied.

FIG. 5 and FIG. 6 illustrate the sub-header of the MAC PDU in the wireless communication system to which the present invention can be applied.

FIG. 7 illustrates formats of the MAC control elements in order to report the buffer state in the wireless communication system to which the present invention can be applied.

FIG. 8 illustrates a UL resource allocation procedure of a UE in the wireless communication system to which the present application can be applied.

FIG. 9 is a diagram illustrating a Random Access Procedure to which the present invention can be applied.

FIG. 10 illustrates a format of an IP packet.

FIG. 11 illustrates a format of a TCP/IP packet.

FIG. 12 schematically illustrates a procedure of establishing a TCP session between end-users by TCP 3-way handshake.

FIG. 13 and FIG. 14 are diagrams illustrating an example of transmitting actual data through scheduling request and BSR procedure.

FIG. 15 is a diagram illustrating an example of transmitting actual data through RACH procedure.

FIG. 16 is a diagram illustrating an example of a window movement of a transmitter according to a transmission success of the first data.

FIG. 17 is a diagram illustrating an example of window size control of a transmitter.

FIG. 18a illustrates an example that a flow is managed in unit of flow, and FIG. 18b illustrates an example that a flow is managed in a unit of bearer.

FIG. 19 illustrates an example of a protocol detection type radio resource managing method according to a UE request proposed in the present disclosure.

FIG. 20 is a diagram illustrating a Context corresponding to Flow ID A in a UE and each network node (eNB and GW) in FIG. 19.

FIG. 21 is a diagram illustrating an example of L2 Packet Data Unit (PDU) format proposed in the present disclosure.

FIG. 22 illustrates another example of a protocol detection type radio resource management method according to a UE request proposed in the present disclosure.

FIG. 23 illustrates examples for Context of Flow ID A in the UE and each network node (eNB and GW) in FIG. 22.

FIG. 24 and FIG. 25 are diagrams illustrating examples a protocol detection type radio resource management method for a plurality of packets proposed in the present disclosure.

FIG. 26 illustrates another example of a protocol detection type radio resource management method according to a UE request proposed in the present disclosure.

FIG. 27 and FIG. 28 illustrate examples of a protocol detection type radio resource management method according to an instruction of a core network node proposed in the present disclosure.

FIG. 29 illustrates another example of a protocol detection type radio resource management method according to an instruction of a core network node proposed in the present disclosure.

FIG. 30 illustrates another example of a protocol detection type radio resource management method according to an instruction of a core network node proposed in the present disclosure.

FIG. 31 and FIG. 32 illustrate example of a protocol detection type radio resource management method according to an instruction between eNB internal modules proposed in the present disclosure.

FIG. 33 illustrates a block diagram of a wireless communication apparatus to which the methods proposed in the present disclosure can be applied.

BEST MODE FOR INVENTION

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an dvanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a schematic structure a network structure of an evolved universal mobile telecommunication system (E-UTRAN) to which the present invention can be applied.

An E-UTRAN system is an evolved version of the UTRAN system. For example, the E-UTRAN may be also referred to as an LTE/LTE-A system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the configurations of a control plane and a user plane of a radio interface protocol between the E-UTRAN and a UE in the wireless communication system to which the present invention can be applied.

FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REG- ISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

Buffer Status Reporting (BSR)

FIG. 4 illustrates the MAC PDU used in the MAC entity in the wireless communication system to which the present invention can be applied.

Referring to FIG. 4, the MAC PDU includes a MAC header, at least one MAC service data unit (SDU) and at least one control element, additionally may include padding.

In some cases, at least one of the MAC SDUs and the MAC control elements may not be included in the MAC PDU.

As an example of FIG. 4, it is common that the MAC control elements are located ahead of the MAC SDUs. And the size of MAC control elements may be fixed or changeable. In case that the size of MAC control elements is changeable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 4, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 4, six header fields may be included. Particularly, the sub-header may include six header fields of R/R/E/LCID/F/L.

For the sub-header corresponding to the very last one among the sub-header corresponding to the MAC control element of fixed size and data fields included in the MAC PDU, as an example illustrated in FIG. 4, the sub-header that is included four header fields may be used. In case that the sub-header includes four fields like this, the four fields may be R/R/E/LCID.

FIG. 5 and FIG. 6 illustrate the sub-header of the MAC PDU in the wireless communication system to which the present invention can be applied.

Each field is described as below with reference to FIG. 5 and FIG. 6.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

LCID: Logical channel identification field identifies a logical channel corresponding to the relevant MAC SDU or identifies a type of the relevant MAC control element and padding. If the MAC SDU is associated with the sub-header, it may show which logical channel the MAC SDU is corresponding to, and if the MAC control element is associated with the sub-header, it may show what the MAC control element is.

Table 1 represents the value of LCID for the DL-SCH

TABLE 1

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |

TABLE 1-continued

| Index | LCID values |
| --- | --- |
| 11110 | DRX Command |
| 11111 | Padding |

Table 2 represents the value of LCID for the UL-SCH

TABLE 2

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index value among truncated BSR, short BSR, and long BSR in the LCID field.

The relationship of mapping between the index and the LCID value illustrated in Table 1 and Table 2 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used, otherwise, the 15-bit L field may be used. In case that the size of MAC control element is changeable, the size of MAC control element may be defined by the L field. In case that the size of MAC control element is fixed, the size of MAC control element may be determined without the size of MAC control element being defined by the L field, accordingly the F and L field may be omitted as shown in FIG. 6.

FIG. 7 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 7(a), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCID field of sub-header, the MAC control element corresponding to the sub-header, as shown in FIG. 7(b), may include four buffer size fields indicating the buffer state of four groups having 0 to 3 LCG IDs. Each of the buffer size fields may be used for identifying the total amount of available data from different logical channel groups.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 8 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 8(a) exemplifies a UL resource allocation procedure for actual data in case that the UL radio resources for the buffer status reporting (BSR) are not allocated to a UE. That is, for a UE that switches a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 8(a), the case that the PUSCH resource for transmitting the BSR is not allocated to a UE is illustrated, and the UE transmits the scheduling request (SR) to an eNB first in order to be allocated with the PUSCH resources (step, S801).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step, S803), the UE transmits the triggered BSR through the PUSCH resources which are allocated by the UL grant (step, S805).

The eNB verifies the quality of data that the UE actually transmit to the UL through the BSR, and transmits the UL grant for the PUSCH resources for actual data transmission to the UE (step, S807). The UE that receives the UL grant for actual data transmission transmits the actual UL data to the eNB through the PUSCH resources (step, S809).

FIG. 8(b) exemplifies the UL resource allocation procedure for actual data in case that the UL radio resources for the BSR are allocated to a UE.

Referring to FIG. 8(b), the case that the PUSCH resources for BRS transmission are already allocated to a UE is illustrated. In the case, the UE transmits the BSR through the allocated PUSCH resources, and transmits a scheduling request to an eNB (step, S811). Subsequently, the eNB verifies the quality of data to be transmitted to the UL by the UE through the BSR, and transmits the UL grant for the PUSCH resources for actual data transmission to the UE (step, S813). The UE that receives the UL grant for actual data transmission transmits the actual UL data to the eNB through the allocated PUSCH resources (step, S815).

FIG. 9 is a diagram for describing a latency in C-plane required in 3GPP LTE-A to which the present invention can be applied.

Referring to FIG. 9, 3GPP LTE-A requests a transition time from an idle mode (a state that IP address is allocated) to a connected mode to be less than 50 ms. In this time, the transition time includes a configuration time (except latency for transmitting S1) in a user plane (U-plane). In addition, a transition time from a dormant state to an active state in the connection mode is requested to be less than 10 ms.

The transition from the dormant state to the active state may occur in 4 scenarios as follows.

Uplink initiated transition, synchronized
Uplink initiated transition, unsynchronized
Downlink initiated transition, synchronized
Downlink initiated transition, unsynchronized
Random Access Channel (RACH) Procedure FIGS. 9a and 9b illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 9a illustrates one example of a contention-based random access procedure, and FIG. 9b illustrates one example of a non-contention based random access procedure.

First, the contention-based random access procedure will be described with reference to FIG. 9a.

The UE receives information about random access from the eNB through system information and stores the received information. Afterwards, in case random access is needed, the UE transmits a random access preamble (which is also called a message 1) to the eNB S901.

If the eNB receives a random access preamble from the UE, the eNB transmits a random access response message (which is also called a message 2) to the UE S902. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S903. At this time, uplink transmission may be described as scheduled transmission.

After receiving the uplink transmission from the UE, the eNB transmits a message for contention resolution (which is also called a message 4) to the UE through a downlink shared channel (DL-SCH) S904.

Next, a non-contention based random access procedure will be described with reference to FIG. 9b.

Before the UE transmits a random access preamble, the eNB allocates a non-contention random access preamble to the UE S911.

The non-contention random access preamble can be allocated through a handover command or dedicated signaling such as signaling through the PDCCH. In case non-contention random access preamble is allocated to the UE, the UE transmits the allocated non-contention random access preamble to the eNB S912.

Afterwards, similarly to the S902 step of the contention-based random access procedure, the UE can transmit a random access response (which is also called a message 2) to the UE S913.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

General TCP/IP

A higher layer protocol scheme may be identified through an IP header of data, and a representative protocol is Transmission Control Protocol (TCP) and User Datagram Protocol (UDP).

Hereinafter, with reference to FIG. 10 to FIG. 12, detailed function and operation of IP and TCP will be briefly described.

FIG. 10 illustrates a format of an IP packet.

Referring to FIG. 10, an IP packet includes a Destination Address (DA) field indicating a Media Access Control (MAC) address of a receiver, a Source Address (SA) field indicating a MAC address of a sender, an E Type field indicating an IP version (IP version 4 or version 6), an IP header and an IP datagram and Cyclic Redundancy Check (CRC) field.

The IP header includes a Version (VER) indicating a version number (IP version 4 or version 6) of the IP header, an Internet Header Length (IHL) indicating a size of the IP header, a Type of Service (TOS) indicating a service quality of a transmitting IP packet, a Total Length indicating an octet length including the IP header and the IP datagram, an Identification referred by a higher layer, Don't Fragment (DF) and More Fragments (MF) that are flags indicating a control in relation to a packet partition, a Fragment Offset indicating a partition interval, a Time to Live (TTL) indicating a valid time when an IP packet is existed in a network, a protocol ID, a Header Checksum, a Source IP address (SA) indicating an IP address of a sender, a Destination IP Address (DA) indicating an IP address of a receiver and IP options for supporting a flexible length.

Here, a protocol ID of 8 bits indicates a layer for generating a packet in an IP higher layer. Protocol ID=1 means ICMP, and protocol ID=2 means IGMP.

FIG. 11 illustrates a format of a TCP/IP packet.

Referring to FIG. 11, an IP header of a TCP/IP packet is referred to as TCP header, and includes TCP data in an IP datagram field. The TCP data may be omitted depending on a situation. The TCP header includes TCP source port number (SP), TCP destination port number (DP), Sequence Number, Acknowledgment Number, TCP Header Length (THL), control flags for controlling a connection and a termination of TCP, a window size for a flow control, TCP checksum, Urgent Pointer and TCP options.

Identification of a TCP session between end-users is performed by TCP source port number and TCP destination port number.

That is, the TCP sessions in an IP access using the same IP address may be forwarded to or received from a corresponding higher layer application program by source/destination port numbers. The TCP source port number is a number for identifying a source application program, and generated arbitrarily when an initial connection is tried (SYN=1). A source port number of TCP cannot be 0, different from UDP, and accordingly, the TCP source port number is valid in the range 1 to 65535.

The TCP destination port number is a number for identifying a destination application program, and generated arbitrarily when an initial connection is tried (SYN=1). Likewise, the TCP destination port number is valid in the range 1 to 65535.

The Sequence Number is a number for ordering data which are forwarded, and given by increasing by 1 for each 1 byte of the transmitted data. The Sequence Number is restarted when it exceeds $2^{32}$.

The Acknowledgement Number is a field indicating a byte position of received data, and is set as Sequence Number+1 of a data position of which reception is completed. The Acknowledgement Number field is used only when the ACK flag described below is ON.

The TCP Header Length is a field indicating a position on which TCP data is started, and interpreted to indicate a size of TCP header since TCP data follows right after the TCP header.

The TCP control flags include Urgent (URG), ACK, Push (PSH), Reset (RST), Synchronization number (STN) and Finish (FIN). The URG is a flag indicating that urgent data is included, and indicates that an urgent pointer, which is described below, is valid. URG may be used when transmitting an interrupt command, for example. ACK is a flag indicating that a valid ACK number is included in TCP header. In TCP 3-way Handshake, ACK flags of all TCP packets except the first TCP packet are set to ON. PSH flag is a flag requesting to forward the received data immediately to an application program, and TCP layer forwards TCP packet immediately to a higher layer process in response to the PSH flag.

The RST flag is a flag which is set in the case of stopping and denying TCP connection. An end-user may terminate a current TCP connection forcibly by transmitting a TCP packet that turns ON the RST flag. The SYN flag is used for synchronizing ACK number by being set to ON by both end-users in TCP 3-way Handshake. The FIN flag is a flag which is set in order to terminate a TCP connection, and a TCP connection is terminated when FIN flag is transmitted from both end-users.

The window size indicates a maximum buffer size of a current state, and a receiver may transmit a receivable data size to a sender through the window size field.

The urgent pointer is valid only when URG flag is 1, and indicates a position of the last byte of data to be processed urgently.

FIG. 12 schematically illustrates a procedure of establishing a TCP session between end-users by TCP 3-way handshake.

Referring to FIG. 12, a sender requests to synchronize the Sequence Number as 100 to a receiver by transmitting a synchronization packet including [SYN=1, ACK=0, sequence number=100].

The receiver sends ACK/synchronization packet including [SYN=1, sequence number=200, ACK=1, ACK number=101] in response to the synchronization packet sent by the sender. The ACK/synchronization packet indicates that the packet of sequence number=100 sent by the sender is successfully received and requests to send the packet of sequence number 101, and also request to synchronize the sequence number to 200. Accordingly, TCP synchronization is established between the sender and the receiver.

The sender sends an ACK packet including [ACK=0, ACK number=201] to the receiver. The ACK packet means that the packet of sequence number 200 sent by the receiver is successfully received, and waits for the packet of sequence number 201.

As described above, different from UDP, TCP connection is needed to be configured before actual user data is transmitted, and ACK for each data reception is needed to be forwarded to an initial sender.

Since the TCP signaling packet for a connection configuration and a reception response is forwarded through wireless network, as shown in FIG. 13 to FIG. 15, delay may occur as much as the time required for UL radio resource request and for performing allocation procedure.

In FIG. 13 to FIG. 15, it is assumed that TTI=1 ms, RACH/SR period=1 TTI, RACH/SR waiting time=½ TTI.

With reference to FIG. 13 to FIG. 15, the conventional UL resource allocation scheme is briefly described.

In the system using a resource allocation scheme based on eNB scheduling, when data (i.e., UL data) that a UE transmits to an eNB is generated, the UE requests a resource for the data transmission to the eNB before transmitting the data to the eNB.

As such, the request of resource of a UE to transmit data to an eNB is referred to as scheduling request.

Such a scheduling request of a UE may be performed through Scheduling Request (SR) transmission to a PUCCH or Buffer Status Report transmission to a PUSCH.

In addition, when a UE is unable to be allocated with a resource to transmit SR or BSR from an eNB, the UE may request an UL resource to the eNB through RACH procedure.

As such, the eNB that receives the scheduling request from the UE allocates the UL resource that the UE is going to use through a DL control channel (i.e., UL grant message, DCI for LTE(-A)).

The DL control channel may be a PDCCH.

In this case, a UL grant transmitted to the UE through a PDCCH may indicate a resource of a subframe that corresponds to the resource allocated to the UE by explicitly signaling, but an appointed time between the UE and the eNB may be defined by a resource allocation for the subframe after a specific time (e.g., 4 ms for LTE).

That is, the eNB allocates a resource after Xms (e.g., 4 ms for LTE(-A)) to the UE since all of the time for the UE to receive and decode a UL grant and the time for the UE to prepare and encode the UL data to transmit.

FIG. 13 is a diagram illustrating a time until a UE transmits actual data through 5 step scheduling request procedure using PUCCH SR resource.

As shown in FIG. 13, a UE may transmit actual uplink data after about 17 ms from the time of transmitting an SR signal.

In this case, the SR resource allocated to the UE may be allocated to a PUCCH with a specific period, minimum 1 ms to maximum 80 ms.

Here, in the case that the SR of 1 ms period is allocated to the corresponding UE, an average time for the UE to wait for the PUCCH resource for an SR transmission is 0.5 ms, and the delay time until the data transmission through a scheduling request to an eNB takes 17.5 ms.

In the case that a UE has an uplink resource allocated from an eNB beforehand, the UE may transmit the resource request for newly generated data by using the resource allocated beforehand.

Alternately, the UE may request an additional resource by transmitting a BSR together with the data transmitted with the resource allocated beforehand.

In this case, as shown in FIG. 14, the delay of 9 ms occurs until transmitting uplink data after a UE request a BSR.

In the case that there is no PUCCH SR resource or PUSCH resource that the UE is allocated from the eNB or the uplink is not synchronized, the UE may request the resource for the newly generated data using the RACH procedure.

That is, as shown in FIG. 15, the delay of 17 ms occurs until the UE transmits uplink data from the time of transmitting the RACH preamble to the eNB.

In this case, the PRACH resource that is available to transmit the RACH preamble may be configured with a specific period for each cell.

Assuming the PRACH resource has the period of minimum 1 ms, the data transmission delay of average 17.5 ms may occur.

That is, as described in FIG. 13 to FIG. 15, delay of minimum 9 ms to maximum 17.5 ms may occur for the UE to transmit UL data.

Accordingly, the eNB allocates an optimal resource in the channel situation of each UE, and there is an advantage of maximizing resource efficiency, but delay may occur in UL data transmission of the UE.

In addition, in the case that a response (e.g., TCP ACK) to specific data (e.g., second data in FIG. 16) is not received in a predetermined time, a sender (transmitter) detects that a transmission of the corresponding data is failed, and decreases a size of a transmission window, and accordingly, does not move the transmission window.

That is, FIG. 16 is a diagram illustrating an example of a window movement of a transmitter according to a transmission success of the first data, and FIG. 17 is a diagram illustrating an example of window size control of a transmitter.

The delay of radio resource occupation for a connection configuration, a reception response, a retransmission, and the like in a higher layer protocol influences on the throughput decrease as well as data transmission delay.

In the wireless aspect for fulfilling the requirement (peak data rate 20 Gpbs, E2E latency<10 ms) of the wideband service such as virtual reality and realistic telecommunication and the low latency service such as disaster safety and vehicle communication, it is required to minimize signaling delay for radio resource occupation.

Protocol Detection Type UL Resource Allocation of Higher Layer

Hereinafter, it is described a protocol detection type UL radio resource allocation method of a higher layer proposed in the present disclosure.

First, the protocol detection type UL radio resource allocation method of a higher layer is referred to as a method of allocating a UL resource by detecting a protocol for transmission and reception data packet in a higher layer in order to minimize the time delay owing to UL radio resource allocation which is required for a connection configuration, a reception response, a retransmission, and the like in a higher layer protocol (e.g., TCP).

In the present disclosure, the service to which the protocol (e.g., TCP) including signaling such as a connection configuration, a reception response, and the like is existed is represented or called by 'specific service'.

In addition, the flow for the specific service is represented or called by 'specific (service) flow'.

The protocol detection type UL radio resource allocation method of a higher layer proposed in the present disclosure may be divided into various manner as described below depending on (1) the subject of requesting (or instructing) an operation of an eNB for a specific service flow, and (2) the subject of detecting (or determining) a protocol of transmission and reception data.

For example, an operation of an eNB instructed in a UE or a higher layer node for a specific service flow may be UL radio resource allocation, no operation, and so on.

In addition, the subject may include (1) UE, (2) network node 1 for performing a flow filtering function of a specific service, and (3) network node 2 for performing header compression/compression release of a higher layer (e.g., TCP/IP).

The network node 1 and the network node 2 correspond to communication network node. The network node 1 for performing a flow filtering function of a specific service may be a gateway (GW), a PDN (P)-GW, and the like, and the network node 2 for performing header compression/compression release of a higher layer may be an eNB, and the like.

The network node 2 may be performed in a network node in which the resource allocation function (MAC) and the function related to higher layer header (PDCP) are the same, and in this case, may be indicated in the form of internal Primitive.

In addition, the network node 1 and the network node 2 may be implemented as a single physical node (object or entity).

For the convenience description, it is classified the case that a subject of detecting/determining a protocol of transmission and reception data is network node 1 is referred to 'Case 1' and the case that a subject of detecting/determining a protocol of transmission and reception data is network node 2 is referred to 'Case 2'.

In addition, a unit of distinguishing a specific service flow between a UE and a network node (e.g., eNB, Gateway) may be divided into (1) a unit of Flow, and (2) a unit of Bearer.

First, in the case that a unit of distinguishing a service flow is 'a unit of Flow'; each flow is distinguished by a Flow ID.

In this case, in the existing form that a plurality of (service) flows may be mapped to a single bearer, a Flow ID is provided and the flow of a specific flow is individually detected, but the remaining flow is detected in a unit of bearer as previously.

In this case, a bearer is a logical path of one or more service flows, and referred to as a unit of managing a service quality.

Hereinafter, the EPS Bearer defined in 3GPP LTE(-A) system is described as an example, but the methods proposed in the present disclosure are not limited thereto.

In addition, an eNB, an MME, P-GW/S-GW of 3GPP LTE(-A) system are described as an example of a network node, but the present disclosure is not limited thereto.

FIG. 18a illustrates an example that a flow is managed in unit of flow, and FIG. 18b illustrates an example that a flow is managed in a unit of bearer.

Next, in the case that a unit of distinguishing is 'a unit of Bearer', a flow distinguishes it by using a Bearer ID (EPS, E-RAB, and DRB) or a Logical Channel ID (LCID) indicating a Layer 2 layer identifier.

In this case, a bearer maps only a single flow which is a specific service.

FIG. 19 illustrates an example of a protocol detection type radio resource managing method according to a UE request proposed in the present disclosure.

Particularly, FIG. 19 shows Case 1 that a specific case is distinguished by a Flow ID and a response packet is received within a retransmission timer for a UL transport packet.

Here, the meaning of 'within a transmission timer' is referred to as time duration from a time when a retransmission timer is started (or driven) to a time when the retransmission timer is terminated (or stopped).

In the case that a specific service is distinguished by a Bearer ID, a transmission for a specific Flow ID is not required in the method shown in FIG. 19.

The reason is because the Flow ID for the specific service is already forwarded or mapped.

Accordingly, the step of comparing whether Flow IDs are identical in an eNB may be replaced by the step of comparing whether Bearer ID or LCIDs are identical instead of the Flow ID.

FIG. 20 is a diagram illustrating a Context corresponding to Flow ID A in a UE and each network node (eNB and GW) in FIG. 19.

Particularly, FIG. 20a shows an example of a context corresponding to Flow ID A in a UE, FIG. 20b shows an example of a context corresponding to Flow ID A in an eNB, and FIG. 20c shows an example of a context corresponding to Flow ID A in a GW.

Referring to FIG. 19, a UE identifies whether to perform a service in a flow based control manner (step, S1901).

The flow based control is a method for managing a specific service in a unit of (service) flow, and an identifier is given for each flow, and accordingly, the (service) flow is individually identified.

In the case of performing a specific flow in the flow based control, a transmitter receives ACK quickly from a receiver (since a window size increases in a sender), and accordingly, the throughput for the corresponding flow may be increased.

Next, in the case that the flow based control is performed, the UE transmits a first message including control information in relation to a specific service flow and a synchronization packet (TCP/IP packet=SYN) to the eNB (step, S1902).

The synchronization packet may be called 'first packet' since it is a packet transmitted for the first time, and for distinguishing it from other packets.

The first message may be called a data packet, a Protocol Data Unit (PDU), Layer 2 (L2) PDU, and so on.

The control information represents information for requesting a protocol detection type radio resource management for a specific flow.

Accordingly, the control information may include a Flow Identifier (Flow ID) for distinguishing a specific service flow, a packet retransmission timer in relation to a packet retransmission, a size (Next Data Size) information of data to be transmitted in a next time, action code information indicating an operation of an eNB requested by the UE when a response (ACK) to a transport packet is received in the UE.

The action code information may be a UL grant as shown in FIG. 19.

The flow identifier may be included in the control information only in the case that a specific service is distinguished by a unit of Flow.

The control information (or protocol detection type radio resource management request information) may be transmitted by being included in L2 (MAC, RLC and PDCP) PDU in a Header form or transmitted through an RRC message as shown in FIG. 21.

Here, the RRC message including the control message may construct an SDU, or the SDU may include each of the control information and the RRC message.

The RRC message includes a higher layer packet.

In addition, the information that may be commonly applied to all packets transmitted from a specific service flow, for example, a retransmission timer value may be exchanged in advance in the process of generating EPS/E-RAB/DRB bearer for the specific flow or modification process.

FIG. 21 is a diagram illustrating an example of L2 Packet Data Unit (PDU) format proposed in the present disclosure.

The L2 PDU shown in FIG. 21*a* to FIG. 21*e* may include a header, a extension header (or additional header) and a Service Data Unit (SDU).

The extension header or the SDU may include the control information described above.

In the case that the extension header includes the control information, the control information is not included in the SDU included in the L2 PDU.

The SDU may have a form of a higher layer packet or an RRC message, or a form in which an RRC message or a higher layer packet are combined.

When the eNB receives the first message from the UE, the eNB may detect that the received first message is the first PDU (TCP/IP packet=SYN) for a service flow and signaling for a protocol connection configuration.

Later, the eNB starts a retransmission timer (reTX timer for F-A) in relation to the first message (step, S1903), and transmits a message including Flow ID A and TCP/IP packet (=SYN) to a core network node (MME/GW) (step, S1904).

In step S1904, a flow identifier is set as 'Flow ID A'.

The core network node may mean a gateway (GW) or an MME, or an entity or a node in which a gateway and an MME are implemented together.

Later, the core network node receives a second message in relation to a response to the first message from an exterior (step, S1905), and forwards the received second message to the eNB (step, S1906).

The second message includes a CN parameter set as 'Flow ID A' and a SYN/ACK packet (TCP/IP packet=SYN+ACK).

Later, the eNB checks whether the second message received in step S1906 and the Flow ID in the first message received in step S1902 are identical (step, S1907).

Next, the eNB terminates the retransmission timer for the first message (step, S1908), and allocates a UL resource corresponding to the operation that the UE requests by step S1902 to the UE, that is, transmits a UL grant to the UE (step, S1909).

It may be limited that the transmission of the UL grant is performed in the case that the Flow IDs are identical as a result of step S1907.

In this case, a size of a UL resource allocation to the UE may be different depending on a data size that the UE notified to the eNB in step S1902.

In addition, a time and duration for UL resource allocation may be determined by considering a UE processing time, and so on.

Later, the UE transmits a third message to the eNB through the UL resource which is allocated (step, S1910).

The third message includes RAN parameter (=Flow ID A), Action Code (Non), and TCP/IP packet (=ACK+data).

Later, the eNB starts a retransmission timer in relation to the third message (step, S1911), and transmits a service flow identifier (Flow ID A) and (TCP/IP) packet (ACK+data) to the core network node (step, S1912).

At this time, the eNB may provide a Transaction number to each packet which is transmitted to the core network node.

In this case, the eNB may forward the Transaction number which is given together with the corresponding service flow identifier and the packet.

Later, the core network node receives a response packet for the packet included in the third message from an exterior, and forwards it to the eNB (step, S1914).

Here, the eNB checks whether the Flow ID and the transaction ID received in step S1910 are identical to the Flow ID and the transaction ID received in step S1914 (step, S1915).

Later, the eNB, that is the eNB that receives a response packet to the second packet (a packet included in the third message, ACK/Data packet) terminates a retransmission timer for the second packet which is started in step S1911 (step, S1916), and performs no operation (Action Code; Non) requested by the UE in step S1910. That is, the eNB does not perform any action.

FIG. 22 illustrates another example of a protocol detection type radio resource management method according to a UE request proposed in the present disclosure.

FIG. 22 shows a form of identifying a protocol of transmission and reception data by performing a procedure such as UL header compression/compression release in an eNB, that is, an example of Case 2.

In addition, FIG. 22 shows a case of receiving a response packet before terminating a retransmission timer.

Since the Flow ID and the Transaction ID described in FIG. 19 are used for the purpose of managing Context more easily, it may be an option for performing the method proposed in the present disclosure whether to provide the Flow ID and the Transaction ID.

FIG. 23 illustrates examples for Context of Flow ID A in the UE and each network node (eNB and GW) in FIG. 22.

FIG. 23*a* shows an example of the context for 'Flow ID A' in a UE, FIG. 23*b* shows an example of the context for Flow ID A in an eNB, and FIG. 23*c* shows an example of the context for Flow ID A in a gateway (GW).

Referring to FIG. 22, a UE transmits a Flow Configuration Request message to an eNB (step, S2201).

The Flow Configuration Request message includes Bearer ID #1, Flow ID A, Flow Mapping Information Element (IE), retransmission timer value, and so on.

Later, the eNB transmits a Flow Configuration Response message in response to the Flow Configuration Request message to the UE (step, S2202).

Each of the eNB, an MME and a GW may be network node (NW node) which is physically distinguished, respectively, and may mean an entity which is functionally divided in a NW node.

Later, the UE transmits the control information (not including retransmission timer value) corresponding to step S2201 in FIG. 22 and a synchronization packet (TCP/IP packet=SYN) to the eNB (step, S2203).

Next, the eNB decodes a UL header of the received packet in a PDCP, and checks the corresponding service flow.

Later, the eNB transmits the synchronization packet to the core network node (MME/GW) (step, S2204).

The synchronization packet does not include a Flow ID value, different from the first packet in FIG. 19.

Since the steps after step S2204 are identical to the steps in FIG. 19, the steps are as referred to FIG. 19.

That is, the step of transmitting and receiving a packet in FIG. 22 is identical to the packet transmission and reception procedure of FIG. 19 except the part that a Flow ID value is not included in a packet.

Next, a protocol detection type radio resource management method in a situation in which a plurality of packets is transmitted and received will be described in detail with reference to FIG. 24 and FIG. 25.

FIG. 24 and FIG. 25 are diagrams illustrating examples a protocol detection type radio resource management method for a plurality of packets proposed in the present disclosure.

Particularly, FIG. 24 shows an example of Case 1, and FIG. 25 shows an example of Case 2.

Referring to FIG. 24, a UE transmits each of a plurality of packets to an eNB (step, S2401).

The methods of FIG. 19 may be applied to the procedure in relation to transmission and reception of each packet.

That is, the UE transmits packet 1 and packet 2 to an eNB, respectively (step, S1401).

The packet 1 includes RAN parameter (=Flow ID A), Action Code (=Non), and TCP/IP packet (=SEQ #100+ACK+Data☐).

The packet 2 includes RAN parameter (=Flow ID A), Action Code (=Non), and TCP/IP packet (=SEQ #101+ACK+Data☐).

Here, a packet may be called a message, a PDU, and so on.

Later, the eNB transmits packet 1 and packet 2 to a core network node (MME/GW) (step, S2402).

Packet 1 that the eNB transmits to the core network node includes Flow ID A, Transaction ID N, TCP/IP packet (=SEQ #100+ACK+Data☐) and packet 2 includes Flow IDA, Transaction ID N+1, TCP/IP packet (=SEQ #101+ACK+Data☐).

Later, the core network node receives a response packet to packet 1 and packet 2 (step, S2403).

The response packet is represented as TCP/IP packet (=ACK #102).

Later, in the case that the core network node receives the response packet from an exterior, the core network node configures a Transaction ID list mapped to a SEQ number value smaller than a response number of the corresponding response packet (step, S2404), and transmits a response packet to the eNB (step, S2405).

Next, the eNB checks whether the Flow IDs and the Transaction IDs in the packets received in step S2405 and step S2401 are identical (step, S2406).

As a result of the check in step S2406, in the case that the Flow IDs and the Transaction IDs in the packets are identical, the eNB terminates a retransmission timer in relation to each packet (step, S2407).

In addition, the eNB transmits a response packet received in step S2405 to the UE (step, S2408).

FIG. 25 relates to a radio resource management method for checking a flow in a PDCP layer of an eNB, like FIG. 24, and a flow identifier is not included in a packet which is transmitted and received between an eNB and a core network node.

That is, the steps of FIG. 25 are substantially the same as the steps of FIG. 24 except the fact that a Flow ID is not included in a packet transmitted and received between an eNB and a core network node.

In FIG. 25, the eNB that receives a response packet from the core network node stops a retransmission timer for a Transaction ID mapped to a SEQ number value which is smaller than a response number of the corresponding packet.

That is, when the eNB receives a response packet (ACK #102) from the core network node, the eNB stops the timer in relation to packet 1 (SEQ #100) and packet 2 (SEQ #101) that are received from a UE.

FIG. 26 illustrates another example of a protocol detection type radio resource management method according to a UE request proposed in the present disclosure.

FIG. 26 is an example of Case 1, and shows an example of the case that an eNB fails to receive a response packet from a core network node in a retransmission timer for a UL transport packet.

Since steps S2601 to S2612 are the same as steps S1901 to S1912 of FIG. 19, the detailed description therefor is omitted.

After step S2612, in the case that an eNB fails to receive a response packet to a second packet from a core network node until a retransmission timer for the second packet (TCP/IP packet (=ACK+Data)) is terminated (step, S2613), after the retransmission timer is expired (step, S2614), the eNB allocates a UL resource for a retransmission of the second packet to the UE (step, S2615).

Since the later steps are identical to steps S1910 to S1916 of FIG. 19, the steps are as referred to FIG. 19.

FIG. 27 and FIG. 28 illustrate examples of a protocol detection type radio resource management method according to an instruction of a core network node proposed in the present disclosure.

FIG. 27 and FIG. 28 show the case that an eNB receives a response packet within a retransmission timer for a UL transport packet from a core network node.

FIG. 27 shows Case 1 and FIG. 28 shows Case 2.

In FIG. 19, the UE requests a UL grant to the eNB, but in FIG. 27, the eNB allocates a UL grant to the UE according to an instruction of the core network node, which are the difference between FIG. 27 and FIG. 19.

Accordingly, the response packet that the eNB receives from the core network node includes an Action code (UL grant) instructing an allocation of a UL grant to the UE.

Further, the response packet that the core network node transmits to the eNB includes an Action code (Non) instruction no action of the eNB.

Except the two steps, the remaining steps are the same as the steps of FIG. 19.

FIG. 28 illustrates another example of a protocol detection type radio resource management method according to an instruction of a core network node proposed in the present disclosure.

FIG. 28 shows the case of receiving a response packet within a retransmission time for a UL transport packet.

Different from FIG. 27, in FIG. 28, a higher layer header is decoded in a PDCP layer of an eNB, and a corresponding flow may be identified through checking a flow identifier mapped to an information value in the header.

Accordingly, it is identified that a flow identifier is not included in a packet that the eNB transmits to or receives from a core network node.

In FIG. 20, the UE requests a UL grant to the eNB, but in FIG. 28, the eNB allocates a UL grant to the UE according to an instruction of the core network node, which are the difference between FIG. 28 and FIG. 20.

Accordingly, the response packet in response to a first packet that the eNB receives from the core network node includes an Action code (UL grant) instructing an allocation of a UL grant to the UE.

Further, the response packet in response to a second packet that the core network node transmits to the eNB includes an Action code (Non) instruction no action of the eNB.

Except the two steps, the remaining steps are the same as the steps of FIG. 20.

FIG. 29 illustrates another example of a protocol detection type radio resource management method according to an instruction of a core network node proposed in the present disclosure.

FIG. 29 shows Case 1, and shows the case that a core network node instructs a protocol detection type radio resource management by receiving a DL packet.

Further, FIG. 29 shows the case of receiving a response packet within a retransmission timer time for a packet.

Referring to FIG. 29, a core network node (MME/GW) receives a first DL packet, that is, TCP/IP packet (=SYN) from an exterior (step, S2901).

Later, the core network node checks whether a service in relation to the received first packet is flow based control (step, S2902).

The flow based control is a method of managing a service flow in a unit of service flow, not a unit of bearer. A flow identifier is provided for each flow, and the service flow is individually identified.

In the case that the received packet corresponds to the flow based control, the core network node transmits the first DL packet including control information in relation to the corresponding service flow to an eNB (step, S2903).

The control information is a flow identifier for identifying a specific service flow, and may include an Action code (UL grant) indicating a UL grant allocation to a UE.

That is, the control information includes CN Parameter (=Flow ID B), and an Action Code (UL grant).

The flow identifier is included in the control information only in the case that a specific flow is distinguished in a unit of Flow.

In the case that the eNB receives a PDU in which a new flow identifier and a higher layer packet from the corer network node (MME/GW), the eNB may identify that the received PDU is the first PDU for the service flow and signaling for a protocol connection configuration.

Later, the eNB transmits the PDU received from the core network node to the UE (step, S2904).

The received PDU corresponds to the first DL packet which is mentioned above.

RAN Parameter (=Flow ID B) and TCP/IP packet (=SYN) are set to the PDU transmitted to the UE or the first DL packet.

Later, the eNB allocates a UL grant to the UE based on the information received in step S2903 and by considering UE processing time (step, S2905).

Next, the UE transmits a retransmission timer value of the corresponding flow, RAN Parameter (Flow ID B) and TCP/IP packet (SYN+ACK) to the eNB through the allocated UL grant (step, S2906).

Later, the eNB starts a retransmission timer (reTX timer for F-A) for the corresponding service flow packet (step, S2907), and transmits the corresponding flow identifier (Flow ID B) and transport packet (TCP/IP packet=SYN+ACK) together to the core network node (step, S2908).

That is, the eNB transmits CN parameter and TCP/IP packet to the core network node.

The core network node may mean a gateway (GW) or an MME, or an entity in which a gateway and an MME are implemented together.

Later, the core network node receives a DL packet (TCP/IP packet (=ACK+Data)) from an exterior, and forwards CN Parameter=Flow ID B) and an Action code (=UL grant) to the eNB together with the received packet (step, S2909).

The eNB checks whether the CN parameter received from the core network node and the Flow ID set to the CN parameter in step S2906 are identical (step, S2910).

Later, the eNB terminates a retransmission timer for the transport packet of the UE in step S2906 (step, S2911), and transmits the UL grant received by an instruction of the core network node through step S2909 to the UE (step, S2912).

Then, the UE transmits RAN parameter (=Flow ID B) and TCP/IP packet (ACK) to the eNB through the UL grant which is allocated (step, S2913).

Later, the eNB transmits CN parameter (=Flow ID B) and TCP/IP packet (ACK) to the core network node.

The eNB provides a Transaction ID number to each packet transmitted to the core network node, and forwards the provided Transaction number (Transaction ID M) together with the corresponding service flow identifier and packet (step, S2914).

Later, the core network node forwards TCP/IP packet (ACK) to an exterior (step, S2915).

Then, the core network node forwards a packet including the CN Parameter (Flow ID B), the Transaction ID M, and an Action Code (Non) (step, S2916).

FIG. 30 illustrates another example of a protocol detection type radio resource management method according to an instruction of a core network node proposed in the present disclosure, and shows Case 1.

Particularly, FIG. 30 is another example of instructing a protocol detection type radio resource management method by a core network node by receiving a DL packet.

In the case of applying Case 2 to FIG. 30, in the last step of FIG. 30, a sequence number instead of Transaction ID (=Transaction ID M) may be included in a packet.

Only the parts different from FIG. 29 will be described.

After an eNB receives a packet including Flow ID 'B' and TCP/IP packet (=ACK) from a UE, the eNB starts a retransmission timer for Flow ID B and Transaction ID M, that is, a retransmission timer for Flow ID B and TCP/IP packet (=ACK).

Later, the eNB checks whether the Flow IDs and the Transaction IDs of the packet received from the core network node and the packet received from the UE are identical.

As a result of the check, in the case that the Flow IDs and the Transaction IDs are identical, the eNB stops the retransmission timer in relation to the packet (Flow ID B and SYN+ACK) that the UE transmits to the eNB.

As described above, FIG. 30 shows the case of receiving a response packet within the timer time.

FIG. 31 and FIG. 32 illustrate example of a protocol detection type radio resource management method according to an instruction between eNB internal modules proposed in the present disclosure.

FIG. 31 shows the case of receiving a response packet to a corresponding packet within a retransmission timer for a UL transport packet of a UE, and FIG. 32 shows Case 1 and the case of receiving a DL packet.

In describing FIG. 31 first, a UE transmits control information and a first packet (synchronization packet) in relation to a specific service flow to an eNB (step, S3101).

The control information includes a flow identifier, a packet retransmission timer in relation to a packet retransmission and Next Data Size information indicating a data size to be transmitted later, as described above.

In FIG. 31, TCP/IP header of a synchronization packet received from the UE is decoded in a PDCP layer of the eNB, and it is able to know the corresponding flow through checking a flow identifier which is mapped.

Here, (1) in the case that the eNB schedules a UL grant in a MAC layer, a UL grant of the UE is instructed through an internal Primitive from the PDCP layer of the eNB to the MAC layer, and (2) in the case that the eNB schedules a UL grant in a PHY (physical layer) by using a determined resource, a UL grant of the UE is instructed using an internal Primitive from the PDCP layer of the eNB to the PHY layer.

Later, the eNB transmits a first packet (TCP/IP packet (=SYN)) to a core network node (step, S3102).

Then, the core network node receives a response packet (SYN+ACK) to the TCP/IP packet from an exterior (step, S3103), and forwards the received response packet to the eNB (step, S3104).

Here, the eNB checks whether of the packet received from the core network node and the Flow ID of the packet received from the UE in step S3101 are identical (step, S3105).

As a result of the check, in the case that the Flow IDs are identical, the eNB stops a retransmission timer for the first packet (step, S3106), and transmits UL resource allocation, that is, a UL grant to the UE (step, S3107).

In this case, a size of the UL resource allocated to the UE may be different according to a data size that the UE notified to the eNB in step S3101.

In addition, the time or duration of the UL resource allocation may be determined by considering UE Processing time, and so on.

Later, the UE transmits the second packet to the eNB through the allocated UL resource (step, S3108).

The second packet includes a Flow ID field of Flow ID 'A' and ACK+Data.

The steps after step S3108 are identical to the corresponding steps of FIG. 19 except the part that a flow identifier is not included in a packet transmitted and received between the eNB and the core network node.

Next, FIG. 32 is described.

FIG. 32 illustrates an example of a case of receiving a DL packet as a radio resource management method according to an instruction between eNB internal modules.

FIG. 32 is described with reference to FIG. 29, but the description of the same step is omitted, and the descriptions of different steps are mainly described.

Referring to FIG. 32, an eNB receives a DL packet from a core network node (step, S3201).

The DL packet is a first DL TCP/IP packet (=SYN).

Here, the eNB transmits a Primitive as a scheduling subject of a UL grant in a PDCP layer and instructs a UL grant transmission to a UE depending on whether a UL grant scheduling entity is a MAC layer or a PHY layer.

Similarly, the transmission time of the UL grant may be determined by considering a UE Processing time.

Later, the UE transmits a retransmission timer value for the first packet of a specific service flow, that is, a packet including flow identification information (Flow ID 'B') and TCP/IP packet (SYN+ACK) to the eNB (step, S3202).

Then, the eNB starts a retransmission timer (reTX timer for F-A) for the TCP/IP packet (SYN+ACK) (step, S3203), and transmits the corresponding packet to the core network node (step, S3204).

That is, the eNB transmits TCP/IP packet (ACK+Data) to the core network node.

Later, the core network node receives a response packet (TCP/IP packet (ACK+Data)) (step, S3205).

Here, the eNB checks whether the Flow ID of the packet received from the core network node and the Flow ID of the packet received in step S3202 are identical (step, S3206).

Later, the eNB stops the retransmission timer started in step S3203, and transmits a UL grant to the UE by considering a UE Processing time (step, S3207).

Next, the UE transmits RAN parameter (=Flow ID B) and a packet of which TCP/IP packet is 'ACK' to the eNB through the UL resource allocated in step S3207 (step, S3208).

Later, the eNB transmits the packet received in step S3208 to the core network node (step, S3209).

Next, the core network node forwards the packet which is received from the eNB (step, S3210).

General Apparatus to which the Present Invention May be Applied

FIG. 33 illustrates a block diagram of a wireless communication apparatus to which the methods proposed in the present disclosure can be applied.

Referring to FIG. 33, a wireless communication system includes a base station (eNB) 3310 and a plurality of user equipments (UEs) 3320 located within the region of the eNB 3310.

The eNB 3310 includes a processor 3311, a memory 3312 and a radio frequency (RF) unit 3313. The processor 3311 implements the functions, processes and/or methods proposed in FIGS. 1 to 32 above. The layers of wireless interface protocol may be implemented by the processor 3311. The memory 3312 is connected to the processor 3311, and stores various types of information for driving the processor 3311. The RF unit 3313 is connected to the processor 3311, and transmits and/or receives radio signals.

The UE 3320 includes a processor 3321, a memory 3322 and an RF unit 3323. The processor 3321 implements the functions, processes and/or methods proposed in FIGS. 1 to 32 above. The layers of wireless interface protocol may be implemented by the processor 3321. The memory 3322 is connected to the processor 3321, and stores various types of information for driving the processor 3321. The RF unit 3323 is connected to the processor 3321, and transmits and/or receives radio signals.

The memories 3312 and 3322 may be located interior or exterior of the processors 3311 and 3321, and may be connected to the processors 3311 and 3321 with well known means.

In addition, the eNB 3310 and/or the UE 3320 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The method for transmitting and receiving a packet in a wireless communication system of the present invention has been described mainly with the example applied to 3GPP LTE/LTE-A system, but may also be applied to various wireless communication systems except the 3GPP LTE/LTE-A system.

The invention claimed is:

1. A method for transmitting and receiving a packet in a wireless communication system, the method performed by a first network node comprising:
   receiving a first message in relation to a connection configuration of a specific flow from a user equipment (UE),
   wherein the first message includes at least one of first control information in relation to the specific flow or a synchronization (SYN) packet, and
   wherein the first control information includes at least one of a first flow identifier (ID) distinguishing a flow, a retransmission timer value in relation to a packet retransmission, data size information indicating a size of a next data or first action code information instructing a resource allocation of the first network node;
   receiving, from a second network node, a second message, based on a message sent including the first flow ID to the second network node when the first message is received by the first network node,
   wherein the second message includes at least one of a SYN/ACK packet or a second flow identifier (ID) distinguishing a flow;
   checking whether the first flow ID and the second flow ID are identical;
   transmitting a UL grant to the UE by considering a processing time of the UE; and
   receiving a third message from the UE through the UL grant,
   wherein the third message includes at least one of second control information and an ACK/Data packet, and
   wherein the second control information includes the first flow ID and second action code information instructing no action of a base station (BS).

2. The method of claim 1, further comprising:
   driving a retransmission timer for the first message after receiving the first message.

3. The method of claim 2, further comprising:
   stopping the retransmission timer when the first flow ID and the second flow ID are identical as a result of the check.

4. The method of claim 1, wherein the first message, the second message and the third message are MAC Protocol Data Units (PDUs), and
   wherein the first control information and the second control information are included in a header included in the MAC PDU.

5. The method of claim 1, wherein the first message and the third message are RRC messages.

6. The method of claim 1, further comprising:
   receiving a flow configuration request message from the UE; and
   transmitting a flow configuration response message to the flow configuration request message to the UE.

7. The method of claim 6, wherein the flow configuration request message includes at least one of a bearer ID, a flow ID, a flow mapping information element (IE) or a retransmission timer value for a flow, and
   wherein the first control information does not includes the retransmission timer value.

8. A method for transmitting and receiving a packet in a wireless communication system, the method performed by a first network node comprising:

receiving a first message in relation to a connection configuration of a specific flow from a user equipment (UE),
wherein the first message includes at least one of first control information in relation to the specific flow or a synchronization (SYN) packet, and
wherein the first control information includes at least one of a first flow identifier (ID) distinguishing a flow, a retransmission timer value in relation to a packet retransmission, or data size information indicating a size of a next data;
receiving, from a second network node, a second message, based on a message sent including the first flow ID to the second network node when the first message is received by the first network node,
wherein the second message includes at least one of a SYN/ACK packet, a second flow identifier (ID) distinguishing a flow or first action code information instructing a resource allocation of the first network node;
checking whether the first flow ID and the second flow ID are identical;
transmitting a UL grant to the UE by considering a processing time of the UE; and
receiving a third message from the UE through the UL grant;
wherein the third message includes at least one of second control information and an ACK/Data packet, and
wherein the second control information includes the first flow ID and second action code information instructing no action of a base station (BS).

9. A method for transmitting and receiving a packet in a wireless communication system, the method performed by a user equipment (UE) comprising:
checking whether to perform a flow based control for a flow, wherein the flow based control maps a flow identifier (ID) for each flow;
transmitting a first message in relation to a connection configuration of a specific flow to a first network node when performing the flow based control,
wherein the first message includes at least one of first control information in relation to the specific flow or a synchronization (SYN) packet;
receiving, from the first network node, a second message, based on a message sent including the first flow ID to a second network node when the first message is received by the first network node, wherein the second message includes at least one of a SYN/ACK packet or a second flow ID;
receiving a UL grant from the first network node; and
transmitting a third message to the first network node based on the received UL grant,
wherein the third message includes at least one of second control information and an ACK/Data packet, and
wherein the second control information includes the first flow ID and second action code information instructing no action of a base station (BS).

10. The method of claim 9, wherein the first control information includes at least one of a first flow identifier (ID) distinguishing a flow, a retransmission timer value in relation to a packet retransmission, data size information indicating a size of a next data or first action code information instructing a resource allocation of the first network node.

11. A user equipment (UE) for transmitting and receiving a packet in a wireless communication system, comprising:
a radio frequency (RF) unit for transmitting and receiving a radio signal; and
a processor functionally connected to the RF unit,
wherein the processor is configured to:
check whether to perform a flow based control for a flow, wherein the flow based control maps a flow identifier (ID) for each flow;
transmit a first message in relation to a connection configuration of a specific flow to a first network node when performing the flow based control,
wherein the first message includes at least one of first control information in relation to the specific flow or a synchronization (SYN) packet;
receive, from the first network node, a second message, based on a message sent including the first flow ID to a second network node when the first message is received by the first network node,
wherein the second message includes at least one of a SYN/ACK packet or a second flow ID;
receive a UL grant from the first network node; and
transmit a third message to the first network node based on the received UL grant,
wherein the third message includes at least one of second control information and an ACK/Data packet, and
wherein the second control information includes the first flow ID and second action code information instructing no action of a base station (BS).

12. The method of claim 11, wherein the first control information includes at least one of a first flow identifier (ID) distinguishing a flow, a retransmission timer value in relation to a packet retransmission, data size information indicating a size of a next data or first action code information instructing a resource allocation of the first network node.

* * * * *